United States Patent
Bunning et al.

(10) Patent No.: US 7,872,149 B2
(45) Date of Patent: Jan. 18, 2011

(54) BIODIESEL PROCESSES IN THE PRESENCE OF FREE FATTY ACIDS AND BIODIESEL PRODUCER COMPOSITIONS

(75) Inventors: Donald Leroy Bunning, South Charleston, WV (US); Louis A. Kapicak, Cross Lanes, WV (US); Thomas Arthur Maliszewski, Charleston, WV (US); David James Shreck, Lake City, MN (US)

(73) Assignee: Best Energies, Inc., Madison, WI (US)

( * ) Notice: Subject to any disclaimer, the term of this patent is extended or adjusted under 35 U.S.C. 154(b) by 117 days.

(21) Appl. No.: 12/441,264

(22) PCT Filed: Sep. 19, 2007

(86) PCT No.: PCT/US2007/020248

§ 371 (c)(1),
(2), (4) Date: Mar. 13, 2009

(87) PCT Pub. No.: WO2008/036287

PCT Pub. Date: Mar. 27, 2008

(65) Prior Publication Data

US 2010/0063309 A1   Mar. 11, 2010

Related U.S. Application Data

(60) Provisional application No. 60/845,718, filed on Sep. 19, 2006.

(51) Int. Cl.
*C07C 51/00* (2006.01)
*C11D 17/00* (2006.01)

(52) U.S. Cl. .................................. 554/169; 510/436

(58) Field of Classification Search ............ 554/169; 510/436

See application file for complete search history.

(56) References Cited

U.S. PATENT DOCUMENTS

| 5,773,636 | A  | 6/1998  | Demmering et al. |
|-----------|----|---------|------------------|
| 6,538,146 | B2 | 3/2003  | Turck            |
| 6,696,583 | B2 | 2/2004  | Koncar et al.    |
| 6,822,105 | B1 | 11/2004 | Luexm et al.     |
| 2005/0204612 | A1 | 9/2005  | Connemann et al. |
| 2008/0287697 | A1 | 11/2008 | Kellens et al.   |
| 2009/0158640 | A1 | 6/2009  | Kellens et al.   |

FOREIGN PATENT DOCUMENTS

| EP | 0 708 813 B1 | 5/1996 |
| WO | WO 95/02661 | 1/1995 |

OTHER PUBLICATIONS

Harten, Biodiesel, Practical Short Course, Quebec Canada, May 2007, (31 pages).
Kemper, Desmet Ballestra Biodiesel Production Technology, Biodiesel Short Course, Quebec City, Canada, May 12-13, 2007, (27 pages).
Crown Companies, Biodiesel Short Course, Quebec City, Canada, May 2007, (47 pages).

*Primary Examiner*—Jafar Parsa
(74) *Attorney, Agent, or Firm*—Pauley Petersen & Erickson

(57) ABSTRACT

Glyceride-containing feed for a base catalyzed transesterification with lower alkanol to make biodiesel is pretreated with glycerin separated during the transesterification to partially convert glycerides with lower alkanol contained in the separated glycerin using base catalyst in the separated glycerin while reducing the free fatty acid and phosphorus compound concentrations in the glyceride-containing feed. Unique producer compositions are provided by the pretreatment processes.

25 Claims, 2 Drawing Sheets

BIODIESEL PROCESSES IN THE PRESENCE OF FREE FATTY ACIDS AND BIODIESEL PRODUCER COMPOSITIONS

CROSS REFERENCE TO RELATED APPLICATIONS

This application claims priority to U.S. Provisional Application No. 60/845,718, filed Sep. 19, 2006, the entirety of which application is incorporated herein by reference.

FIELD OF THE INVENTION

This invention pertains to improved processes for the manufacture of biodiesel fuels by the base catalysis of glycerides to form aliphatic esters where free fatty acids are present in the glyceride-containing feed. This invention also pertains to processes for recovery of free fatty acids from glyceride-containing feeds. This invention further pertains to producer compositions useful as feeds for making biodiesel by transesterification of glycerides with lower alkanol.

BACKGROUND TO THE INVENTION

Biodiesel is being used as an alternative or supplement to petroleum-derived diesel fuel. Biodiesel can be made from various bio-generated oils and fats from vegetable and animal sources. One process involves the transesterification of triglycerides in the oils or fats with a lower alkanol in the presence of a base catalyst to produce alkyl ester and a glycerin co-product.

Biodiesel must meet demanding product specifications. See, for instance, ASTM D 6751, American Society for Testing and Materials. This standard provides, among other things, that biodiesel have a methanol content of less than 0.2 volume percent, a water and sediment content of no more than 0.05 volume percent, an acid number of no more than 0.50 milligrams of potassium hydroxide per gram of biodiesel, free glycerin of no more than 0.020 mass percent, and a phosphorus content of no more than 0.001 mass percent (calculated as elemental phosphorus). Biodiesel should also exhibit stability in storage, particularly stability against oxidation degradation.

Accordingly, refining of crude biodiesel is required to remove lower alkanol, water, and salts of fatty acids. Under the basic transesterification conditions, any free fatty acids contained in the raw material feed or generated during the process are converted to soaps. These soaps must be removed from the biodiesel product. A significant portion of the soaps can be removed by a phase separation of a glycerin-containing phase, which will also contain soaps, from the crude alkyl ester-containing biodiesel, and water washing which also serves to remove neutralized base catalyst.

To minimize the formation of soaps which must be removed from the crude biodiesel, many process operators prefer to use raw material feedstocks with a low content of free fatty acids such as refined soybean oil. However, the sought refined oils with low free fatty acid content may not be readily available, or other oils and fats may be more economically attractive raw material feedstocks. Hence, processes are sought that offer the ability to use raw material feedstocks containing free fatty acids, and especially processes that can tolerate changes in free fatty acid content of the raw material feedstocks.

One of the attractive features of processes for making biodiesel is that biodiesel processes do not require the complex feedstock treatment and distillation operations associated with a petroleum refinery. Consequently relatively small facilities to serve a local area can be economically viable in comparison to large, petroleum refinery-scale facilities. This economic viability would be reduced if substantial additional unit operations were required to handle free fatty acids and other undesirable impurities.

The unit operations for removal of soaps from crude biodiesel are sized to handle certain amounts of soaps. Thus the ability of the operator to use raw material feedstocks containing higher free fatty acid content is limited. Water presence during the transesterification is available for reaction with glycerides and alkyl ester to form free fatty acid which in turn reacts with base to form soaps. Additionally, the amount of soaps generated as side products during the transesterification process often increases with increased severity of the base-catalyzed transesterification reaction. Not only can the soaps provide processing difficulties in the transesterification process but also the capacity of the unit operations for removal of soaps can be limiting on production capacity.

Free fatty acids, while not directly useful in biodiesel as product specifications typically mandate that the biodiesel contain little free acid, can be converted to esters suitable for inclusion in biodiesel. Numerous processes have been proposed. See, for instance, U.S. Pat. No. 6,822,105; U.S. Patent Application Publication No. 2005/0204612; and Canakci, et al., Transactions of ASAE, 42, 5, pp. 1203-10 (1999).

Turck in U.S. Pat. No. 6,538,146 discloses a method for producing fatty acid esters of alkyl alcohols using oils that contain free fatty acids and phosphatides. They summarize their process as treating the feed with a base mixture of glycerin and a catalyst to produce a two phase mixture with the neutralized free fatty acids passing into the glycerin phase. The oil phase containing the triglycerides is then subjected to transesterification. See column 2, lines 35 et seq. At column 4, lines 41 et seq., Turck poses that the free fatty acids can be separated per WO 95/02661 and subject them to esterification with an alcohol. The esterified product can be added to the transesterification mixture.

Koncar, et al., in U.S. Pat. No. 6,696,583 disclose methods for preparing fatty acid alkyl esters in which fatty acids contained in a glycerin phase from a transesterification are separated and mixed with an esterification mixture containing triglycerides and is subjected to esterification to form fatty acid esters. The object of their process is to process the fatty acid phase in the untreated state, i.e., without purification and removal of sulfuric acid. The esterification product is then transesterified with alcohol. Koncar, et al, refer to EP-A-0 708 813 as disclosing the esterification of free fatty acids at column 2, lines 26 to 34.

Demmering, et al., in U.S. Pat. No. 5,773,636 disclose processes for the production of fatty acid lower alkyl esters in which the feed is treated with acid at elevated temperatures and then transesterified with lower alkanol. The patentees state that the acid treatment provides fatty acid lower alkyl ester free from unpleasant odors and discoloration.

Various processes are commercially offered for pretreating fats and oils to provide triglyceride-containing feeds for base transesterification. These processes remove free fatty acids and many are adapted to remove phospholipids. Westfalia Separator Food Tec GmbH offers a slate of pretreatment equipment and processes depending upon the sought product and the nature of the feed. In one process, herein referred to as the Alkaline Refining Process, feed is treated with acid to degum (removal of phospholipids), then contacted with base such as sodium hydroxide to convert free fatty acids to salts. The salts are removed by centrifuging and the feed is water washed and dried to provide a feedstock for transesterification. They also have an alcohol neutralization refining process. In this process, the feed is contacted with an acid/methanol solution, then contacted with an alkaline/methanol solution followed by contact with a glycerin/alcohol/alkali mixture from transesterification. Soaps are removed by centrifuge and the neutralized and degummed oil is fed to a base transesterification. Westfalia also offers a special degumming and alcohol neutralization for rapeseed oil, soybean oil and palm oil and a cold degumming plus alcohol neutralization process. These processes are described by Harten, Practical Short Course "Biodiesel", Quebec Canada, May 2007.

Desmet Ballestera have a pretreatment process which involves an acid conditioning using phosphoric or citric acid to convert non-hydratable phosphorus to a hydratable form so that it can be removed with water. The resulting acid conditioned feed is neutralized with sodium hydroxide. Then soaps are removed by centrifuging. If necessary a silica purification step can be used. The feed is then dried. Bleaching can be done, but usually is not necessary. In their transesterification process, three reactors are used. Glycerin and catalyst is recovered from the second reactor and is fed along with methanol, additional catalyst and feed, to the first reactor. Kemper, Desmet Ballestra Biodiesel Production Technology, Biodiesel Short Course, Quebec City, Canada, May 12-13, 2007.

Crown Iron Works Company has a process for degumming and refining feeds involving acid treatment, followed by neutralization with caustic, centrifuging to remove soap or gums, silica treatment and then drying and filtering to provide a refined feed. Waranica, Crown lion Works Biodiesel Production Technology, Biodiesel Short Course, Quebec Canada.

Degumming, however, can result in a loss of feedstock that can be converted to biodiesel. Some feedstock such as crude soy oil can contain 3 mass percent or more of phospholipids. Most phospholipids are diglycerides with one substituent on the glycerin backbone being a phosphorus-containing moiety.

Another concern in producing biodiesel by transesterification of glycerides with lower alkanol is that the reaction, being equilibrium limited, must use a stoichiometric excess of lower alkanol to drive the transesterification to high conversions. In some instances, the amount of methanol provided is at least twice that required for stoichiometric transesterification. The unreacted lower alkanol preferentially partitions to glycerin and should, for an economically attractive process, be recovered from the glycerin and recycled to the transesterification. Processes such as described by Desmet Ballestra and Crown Iron Works distill methanol from the glycerin removed from the oil phase containing the alkyl esters for biodiesel. Water contained in the glycerin will also be removed during the distillation. As water reacts during transesterification to form free fatty acids and thus soaps, additional distillation may be required to dehydrate the methanol. The heat energy requirements for the distillation can represent a significant cost to the biodiesel producer.

The biodiesel producer can operate with a lower methanol to feed ratio and thereby reduce the amount of methanol that needs to be distilled from the glycerin per unit of biodiesel produced. The consequences of using lower methanol to triglyceride molar ratios is one or more of slower reaction rates and less complete conversion of the triglyceride to alkyl ester.

Processes are sought that are sufficiently robust to allow feeds of varying free fatty acid content to be used without undue complexities and capacity restrictions. Processes are further sought that can enable de-bottlenecking of existing, base-catalyzed transesterification processes. Processes are further sought that reduce the variable costs in making biodiesel including reducing the amounts of lower alkanol and base catalyst required per unit of biodiesel production and reducing the energy consumption of a facility making biodiesel.

SUMMARY OF THE INVENTION

Processes of this invention involve the pretreatment of glyceride-containing feeds to provide advantageous pretreated feeds for use in transesterification with lower alkanol to provide biodiesel. The processes of this invention not only remove undesirable components from glyceride-containing feeds such as free fatty acids and phospholipids but also do so in a manner that can reduce energy consumption per unit of biodiesel produced. The processes of this invention contact glycerin co-product from transesterification of glycerides with lower alkanol, which stream contains lower alkanol and base catalyst, with glyceride-containing feed under transesterification conditions to provide a pretreated feed. The pretreatment removes a portion of the alkanol in the spent glycerin stream through reaction with the glycerides and through partitioning to the oil phase, that is, the pretreated feed. The pretreatment also removes undesirable components from the glyceride-containing feed such as free fatty acid and phosphorus compounds and can remove water.

Advantageously, since the pretreatment processes of this invention also result in removing lower alkanol from the glycerin co-product through reaction and partitioning, recovery of lower alkanol from the glycerin phase through distillation can be avoided. Additionally, the co-product glycerin phase can be used for the pretreatment even if it contains water, whereas methanol that is recovered from co-product glycerin often has to be dehydrated, e.g., through an additional distillation, prior to being recycled. The pretreated feed contains partially converted glycerides and alkanol. The presence of fatty acid ester and mono- and diglycerides in the pretreated feed provide several advantages. First, they increase the solubility of the lower alkanol in the oil phase thereby enhancing the amount of alkanol that can be recovered from the co-product glycerin. Second, the pretreated feed needs not to undergo any incubation period for transesterification. Consequently plug flow transesterification reactors become a more attractive option. Third, for a given lower alkanol to glyceride-containing feed molar ratio the transesterification operation can benefit through one or more of increased production and higher conversion. The transesterification is an equilibrium-limited reaction and hence the molar ratio of alkanol to glyceride feed is a primary determinant of reaction rate and conversion. This increase in productivity that can be obtained using the processes of this invention is typically greater than that anticipated by the fact that the pretreated feed is partially converted. This enhancement in productivity is enabled by using lower alkanol and catalyst lost from the oil phase in the transesterification to the co-product glycerin phase in the pretreatment.

One broad aspect of the invention pertains to improved processes, batch or preferably continuous, for making fatty acid esters from glyceride-containing feed containing free fatty acid and phosphorus-containing species comprising:

a. transesterifying a pretreated glyceride feed with lower alkanol, preferably an alkanol having 1 to 3 carbon atoms, more preferably a primary alkanol, and most preferably methanol, under transesterification conditions including the presence of base catalyst to provide a transesterification menstruum comprising a transesterification oil phase containing fatty acid ester and a transesterification glycerin phase, containing unreacted lower alkanol and base catalyst;

b. phase separating from said transesterification menstruum the transesterification oil phase and the transesterification glycerin phase;

c. contacting at least a portion of the transesterification glycerin phase from step (b) with glyceride containing feed to provide menstruum comprising a pretreatment oil phase containing glycerides and a pretreatment glycerin phase, said contacting being for a time and at a temperature and in the presence of base catalyst sufficient to (i) react at least about 20 mass percent of the alkanol, preferably at least about 30, and most frequently between about 50 and 90, mass percent of the alkanol, with glycerides to provide fatty acid ester, (ii) convert free fatty acids to soaps (iii) and convert, e.g., by reaction or hydration, phosphorus-containing species to phosphorus compounds soluble in glycerin; and d. phase separating the menstruum to provide a pretreated glyceride feed containing glyceride and lower alkanol and having a reduced concentration of free fatty acids and a reduced concentration of phosphorus-containing species, and a spent glycerin-containing phase containing soaps and phosphorus compounds and having a reduced concentration of alkanol.

The separated, pretreated glyceride feed may be passed in whole or part to step (a) and may in whole or part be provided as a producer composition that can be used as feed to other base transesterification biodiesel facilities. The mass ratio of transesterification glycerin phase to glyceride-containing feed in step (c) can vary widely while still obtaining the sought pretreatment as well as reduction of alkanol in the glycerin phase. Where the pretreatment treats the entire glyceride-containing feed to the transesterification of step (a), the mass ratio of transesterification glycerin phase to glyceride-containing feed in step (c) is often in the range of about 1:5 to 1:12. Steps (a) and (b) can use an additional glyceride-containing feed or a different glyceride-containing feed, and may even be conducted in one or more separate facilities. Similarly, a greater or lesser rate of glyceride-containing feed may be treated than is required for step (a). Preferably in these broad aspects of the invention, the transesterification glycerin phase to glyceride-containing feed in step (c) is within the range of about 1:2 to 1:30, more preferably between about 1:5 to 1:20. Within the broad aspects of the processes of this invention, it is contemplated that the base catalyst in the transesterification glycerin phase may comprise all or a portion of the base catalyst for step (c) or a separate base catalyst may be used for step (c). Where the transesterification glycerin phase is transported, e.g., by truck or rail, it may be desirable to neutralize the base catalyst such that a strong caustic solution need not be shipped.

Preferably the pretreatment results in a free fatty acid content in the pretreated glyceride feed of less than about 0.1, more preferably less than about 0.05, mass percent. The phosphorus content in the pretreated glyceride feed is typically reduced by at least about 50, preferably at least about 70, percent (on an elemental basis). In many instances the oil phase contains less than about 30, more preferably less than about 10, ppm by mass (calculated as elemental phosphorus). Preferably, the pretreated glyceride feed of step (d) contains less than about 0.5, more preferably less than about 0.1, mass percent water as a result of the contacting of the glyceride-containing feed with glycerin in step (c).

Frequently the glycerin stream from step (b) contains at least about 10, most often at least about 20, say, about 20 to 50, and sometimes from 25 to 45, mass percent alkanol. The total portion of alkanol removed through reaction and partitioning of step (c) is typically at least about 30, and preferably from about 50, and sometimes at least about 80, mass percent. The pretreatment process can, in some instances, recover a total of up to 90 or more mass percent of the alkanol contained in the transesterification glycerin phase. Step (c) is conducted in a manner by which alkanol is reacted and unreacted alkanol from the glycerin passes into the pretreated glyceride feed prior to a point where base catalyst in the glycerin phase contacts free fatty acid. Hence step (c) is preferably conducted with countercurrent contact of glyceride-containing feed and co-product glycerin, by using one or more reaction stages which can either be separate vessels or countercurrent flow in a single vessel. For instance, at least two reaction stages can be used. For example in a two stage system, transesterification glycerin phase is first passed to an alkanol consumption stage and a glycerin phase containing base catalyst is separated therefrom and passed to a fatty acid neutralization stage where fatty acid neutralization occurs. Glyceride feed is first passed to the fatty acid neutralization stage and then is separated and passed to the alkanol consumption stage. Since the glyceride-containing feed undergoing pretreatment has little, if any fatty acids after the fatty acid neutralization stage, base catalyst in the alkanol consumption stage is not lost to neutralization of free fatty acid. The reactor stages may be effected in separate vessels. Alternatively, a single vessel may be used with a counter current flow of glycerin from step (a) and feed containing glyceride to provide at least two reaction stages. Preferably, at least one stage converts at least a major portion of the free fatty acids in the glyceride feed to step (c) to soaps and at least one stage primarily consumes alkanol. In preferred aspects of the processes of this invention, the spent glycerin of step (d) contains less than about 5, and more preferably less than about 2, mass percent lower alkanol.

In some instances the glyceride-containing feed passed to step (c) comprises between about 0.1 and 3, more preferably between 0.1 and 2.5, mass percent free fatty acid. Where phosphorus-containing species are present in the glyceride-containing feed, they are often in an amount of at least about 30, and sometimes in excess of about 1000, parts per million-mass (ppm-m) (calculated as elemental phosphorus). The glyceride-containing feed may also contain water which in some instances can be present in an amount of at least about 0.5, even greater than 1, mass percent of the feed.

The phase separations of steps (b) and (d) can result in a rag layer being formed between the oil phase and the glycerin phase. The rag layer contains both oils (e.g., glycerides and fatty acid esters) and glycerin. The cause of the formation of the rag layer is not certain and it is believed that soaps and phospholipids can exacerbate the propensity to form a rag layer and extent of rag layer formation. While more extensive phase separation operations can be used to minimize or eliminate this rag layer, a preferred aspect of the processes of this invention is to separate at least a portion, and sometimes essentially all, of the rag layer from the oil phase and provide the rag layer with the glycerin phase being passed to step (c). Entrained oil can, thus, be recovered from this rag layer during the pretreatment and separation of steps (c) and (d). The treatment of phospholipids to step (c) can, in some instances, enable the phospholipids, which are glycerides with one substituent containing phosphorus, to be transesterified to provide alkyl ester. Thus, in this preferred aspect of the processes of this invention, not only is phosphorus removed, but also fatty acid values that would typically be lost by removal of phospholipids through conventional degumming pretreatment operations, are converted to biodiesel.

If desired, the saponified fatty acids contained in the spent glycerin from step (d) can be converted from soaps to free fatty acids. Free fatty acids can be removed from the glycerin by phase separation. The fatty acids can be used in any suitable manner. For instance, the fatty acid can be esterified by acid catalyst and lower alkanol to provide alkyl ester for biodiesel. Fatty acid can be incorporated into the biodiesel product provided that the total free fatty acid does not exceed that acceptable for commercial acceptability. Another use for the fatty acid is to react it with glycerin to form glyceride. The glyceride can be used as feed to the biodiesel process. Also, fatty acids can be recovered for use as a raw material to make other chemicals such as surfactants.

In a further preferred aspect of the processes of this invention, the glyceride-containing feed is subjected to acid treatment prior to being passed to step (c) under acid treatment conditions. Acid treatment conditions used will depend upon the nature of the glyceride-containing feed and the desired pretreatment sought. For instance, with glyceride feeds containing high concentrations of free fatty acids, it may be beneficial to use acid treatment conditions that esterify free fatty acid with lower alkanol. With glyceride-containing feeds that contain significant amounts of phospholipids, the acid treatment conditions may be sufficient to modify the phospholipids to facilitate removal by extraction into water or glycerin. Acid treatment conditions include the presence of a catalytically effective amount of Bronsted acid or Lewis acid, however, Lewis acid catalysts typically require the use of higher temperatures to effect esterification than do Bronsted acid catalysts. Where esterification of free fatty acids is sought, lower alkanol is present, usually in a molar excess of that required for the sought extent of conversion of free fatty acid to fatty acid ester by esterification. As the esterification reaction is equilibrium limited, the acid treatment may be conducted to convert only a portion of the free fatty acid, preferably such that the acid treated feed contains an amount of free fatty acid that will consume base catalyst in step (c). Preferably the amount of free fatty acid in the esterification effluent does not exceed the amount of base catalyst in step (c). If desired, the soaps produced in step (c) which will be contained in the glycerin phase, can be acidified and converted to free fatty acids for recycle to the acid treatment. Typically in such preferred embodiments, the acid treated feed will contain from about 0.5 to less than about 3 mass percent free fatty acid. Acid treatment also can convert phospholipids to hydratable form and thus facilitate their removal from the glyceride-containing oil phase. Water co-product from esterification can be removed by any suitable means including, but not limited to distillation fractionation, sorption and preferably extraction with glycerin, e.g., spent glycerin from (d).

The processes of this invention provide unique producer compositions that are advantageous for use in base transesterification to make biodiesel. The producer compositions are characterized as having partially converted glycerides; having low concentrations of undesirable species such as phosphorus compounds, free fatty acids and water; and contain unreacted lower alkanol. Hence, base transesterification processes using the producer compositions of this invention as at least a portion of the glyceride-containing feedstock can achieve enhanced production, higher quality product and lower variable costs per unit of biodiesel produced. The producer compositions of this invention comprise:

a. between about 20 and 70 mass percent triglyceride;
b. between about 10 and 25 mass percent total mono- and di-glycerides;
c. between about 20 and 50 mass percent fatty ester of lower alkanol;
d. between about 0.5 and 5 mass percent lower alkanol, preferably methanol;
e. less than about 0.1, preferably less than about 0.05, mass percent free fatty acid;
f. less than about 0.1, preferably less than about 0.05 mass percent water; and
g. less than about 30, preferably less than about 10, ppm-m phosphorus compound (calculated as elemental phosphorus).

Preferably the producer compositions of this invention are substantially neutral and thus are not classified as a caustic solution for purposes of shipping. As base catalyst is highly soluble in the spent glycerin from step (d), the producer composition contains only a trace of base catalyst and usually needs not be neutralized. Hence the producer composition often contains less than about 0.05, preferably less than about 0.01, mass percent inorganic salts. The producer compositions of this invention can be made from glyceride-containing feeds that are considered to be less desirable feeds for base transesterification such as crude soy oil that often contains a significant content of phospholipids; crude corn oil, especially from fermentation processes, which contains significant concentrations of free fatty acids; and animal fats that also contain significant concentrations of free fatty acids.

DETAILED DISCUSSION

Processes for making biodiesel will be further described in connection with FIG. 1 which schematically depicts biodiesel manufacturing facility 100. Facility 100 is provided with a transesterification component (generally designated by numerals in the 200 series) as well as pretreatment components (generally designated by numerals in the 100 series) and a refining component generally (designated by numerals in the 300 series).

Glyceride-Containing Feeds

Biodiesel manufacturing facility 100 uses a suitable raw material, glyceride-containing feed. A wide range of glyceride-containing feeds can be used, and the point of introduction of such feeds into facility 100 will be influenced by the nature of the feed, especially the impurities therein. Glycerides are aliphatic glycerides where the aliphatic groups contain between about 8 and 30, often between about 14 and 24 carbon atoms. Triglycerides have three such aliphatic groups, diglycerides, two such groups, and monoglycerides, one such group. The feed may be one or more suitable oils or fats derived from bio sources, especially vegetable oils and animal fats. Examples of glyceride-containing feeds include, but are not limited to rape seed oil, soybean oil, cotton seed oil, safflower seed oil, castor bean oil, olive oil, coconut oil, palm oil, corn oil, canola oil, jatropha oil, rice bran oil, tobacco seed oil, fats and oils from animals, including from rendering plants and fish oils.

Generally, the free fatty acid in the raw material feed is less than about 60 mass percent (dry basis). Suitable feeds may also contain phospholipids which may be as much as about 2 to 5 mass percent (dry basis) of the feeds. The balance of the fats and oils is largely fatty acid triglycerides. The unsaturation of the free fatty acids and triglycerides may also vary over a wide range. Typically, some degree of unsaturation is preferred to reduce the propensity of the biodiesel to gel at cold temperatures. Additionally, more than one glyceride-containing feed can be simultaneously used to provide a blended biodiesel product. The blend can be designed to adjust the cloud point of the product to a suitable level, or to take advantage of multiple feeds available to the producer. The facility is capable of handling less expensive glyceride-containing feedstocks, especially those containing free fatty acids and phospholipids. Preferred feeds comprise unrefined or partially refined soy oil, crude corn oil removed from syrup or distillers dried grain from fermentation processes, e.g., to make ethanol, and animal fats, and mixtures thereof and mixtures with other glycerides.

Pretreatment by Acid Treatment

Figure 1:
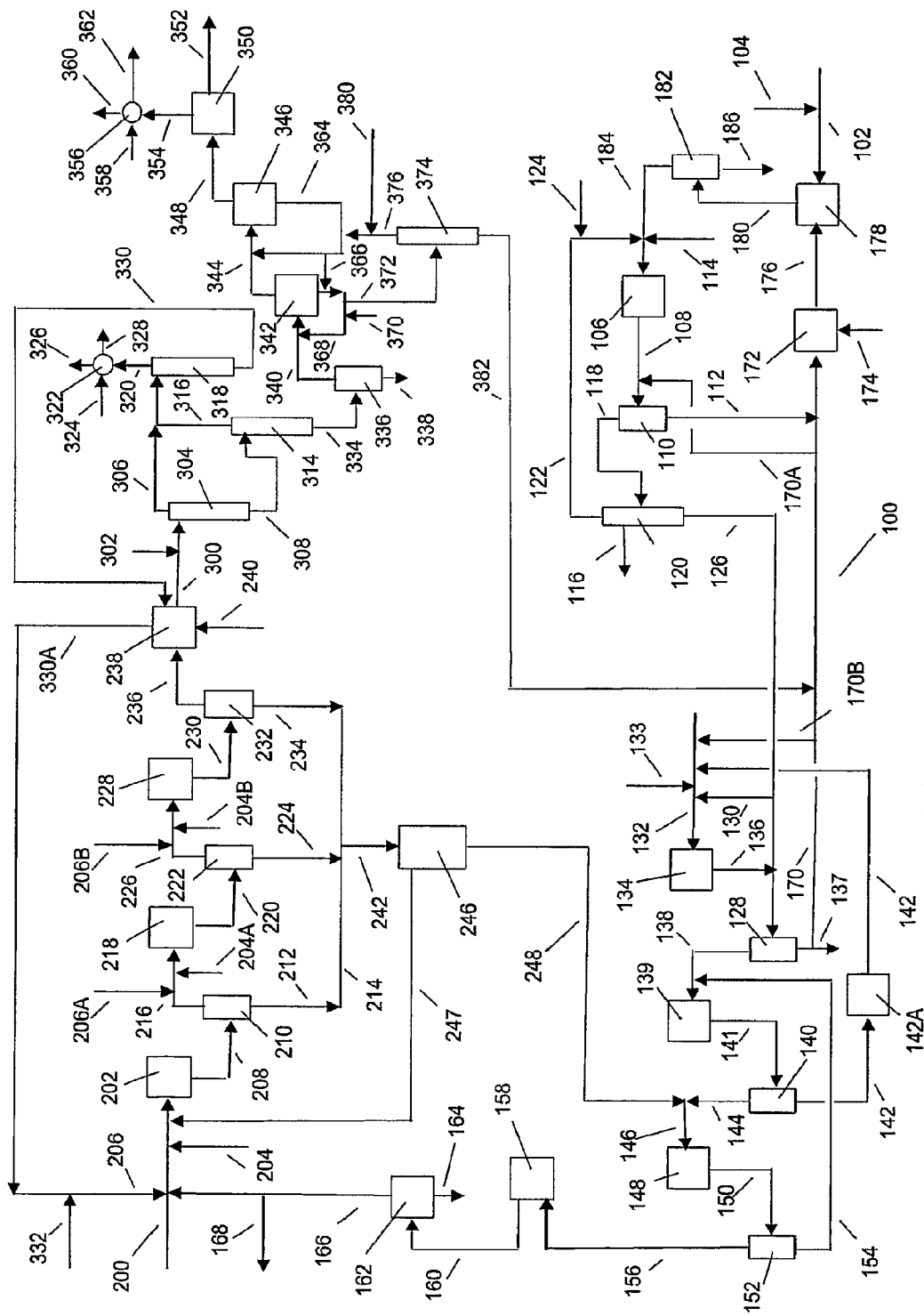
FIG. 1 is a schematic representation of a biodiesel facility using the processes of this invention.

As shown in FIG. 1, feed containing at least one of phospholipid and free fatty acid can be provided to facility 100 via line 102 for pretreatment by acid. Line 104 is provided in the event that more than one feed is desired to be processed in the acid treatment section. For instance, a blend of crude soy oil, which contains low concentrations of free fatty acid but higher concentrations of phospholipids, and crude corn oil, which contains higher concentrations of free fatty acid and lower concentrations of phospholipids, can be acid treated.

The feed may be directly introduced into acid treatment reactor 106, or as shown, is subjected to a contact with an alkanol laden stream of glycerin to strip alkanol from the glycerin into the oil-containing feed phase. This contact will be described later.

For purposes of this discussion, the feed will contain both free fatty acids and phospholipids, and acid treatment reactor 106 serves both to convert free fatty acid to esters and to facilitate removal of phospholipids. Broadly, esterification is conducted with alkanol, which may be a diol, but preferably is a monoalkanol, having a primary —OH, under esterification conditions. The preferred alkanols are lower alkanols, especially those having 1 to 3 carbons, although butanol and isobutanol and higher alkanols are operable. Most preferably the alkanol is methanol. Esterification conditions include the presence of acidic catalyst, elevated temperature, e.g., at least about 40° C. and sometimes as high as 200° C. or more, and especially where the reaction menstruum is to be in the liquid phase, such high temperatures may be accompanied with the use of superatmospheric pressures sufficient to maintain the liquid phase. Preferably an inerting gas such as nitrogen, hydrocarbon gas such as methane or carbon dioxide is used during the acid treatment.

The preferred conditions for the acid treatment will depend upon the nature of the feed, the type of acid treatment sought, and the apparatus. Reactor 106 may comprise one or more stages or vessels and separation unit operations may be located between each stage or vessel. Where reactor 106 is staged, it is often desirable to remove water between stages to enhance conversion of free fatty acid to esters. Reactor 106 may be a vessel or a length of pipe. But preferably other types of vessels are used such as mechanical and sonically agitated reactors, and reactors with static mixing such as reactors containing contact structures such as trays, packing, baffles, orifices, venturi nozzles, tortuous flow path, and other impingement structures. Suitable reactors include those providing high intensity mixing, including high shear.

The molar ratio of alkanol to free fatty acid in the feed will vary depending upon the reactivity of the alkanol and the extent of esterification sought. The esterification reaction is an equilibrium limited reaction and hence an excess of alkanol may be used to drive the reaction to the desired degree of completion. As will be discussed later, any unreacted free fatty acid can be recovered elsewhere in the process and returned to acid treatment reactor 106. Often, the alkanol and the residence time in reactor 106 is sufficient to convert at least about 30 mole percent, and preferably at least about 50 mole percent, and sometimes at least about 75 mole percent to essentially all, the free fatty acid to ester. Where less than all the free fatty acid is converted to fatty ester, it is preferred that the oil phase from the acid treatment section of facility 100 contain less than about 3, most preferably less than about 2, mass percent free fatty acid. Where no free fatty acid is present in any of the feeds to reactor 106, the use of alkanol is optional as it is not essential for phospholipid removal. Where esterification is sought, the molar ratio of alkanol to free fatty acid is generally between about 0:5:1 to 20:1, and preferably between about 0.9:1 to 10:1, and most preferably between about 3:1 to 9:1.

In one preferred embodiment where the feed contains free fatty acids, the oil phase from the acid treatment section of facility 100 contains at least about 0.5, say between about 0.5 and 2 or 3, mass percent free fatty acid. This free fatty acid serves to neutralize at least a portion of the base catalyst contained in a spent glycerin stream produced in the transesterification and base pretreatment sections of facility 100. Preferably, the molar ratio of free fatty acid in the oil phase from the acid treatment to mole of base in the glycerin phase introduced into base reactor 134 as discussed below will be at least about 0.3:1, often at least about 0.7:1 up to about 1:1. The use of ratios of free fatty acid to base catalyst of greater than 1:1 can adversely affect the performance of the base pretreatment. A number of advantages flow from this preferred embodiment. For instance, the equipment and conditions required for the esterification section need not be of the type required for essentially complete conversion of the free fatty acids, resulting in capital and operating cost savings. Since residual free fatty acid is converted to soap and removed in the base pretreatment section, the feed to the transesterification section can be substantially devoid of free fatty acid which adversely affects the base catalyst therein. Additionally, the neutralized spent glycerin stream from the base pretreatment section can be used effectively for enhancing phase separation and water and catalyst removal from the acid treatment product.

Without being limited to theory, it is believed that the water hydrolyzes or hydrates the phospholipids in the presence of acid to provide a water soluble phosphorus compound that can be removed from the oil phase by extraction into a water or glycerin phase. Water for the hydrolysis or hydration may comprise that co-produced in the esterification of free fatty acids or provided by other streams within facility 100.

The catalyst can be heterogeneous or homogeneous. Where heterogeneous, it may be a solid or a highly dispersed liquid phase. As shown, liquid catalyst is provided via line 114 to acid treatment reactor 106. Any suitable acid catalyst (Bronsted acid or Lewis acid) for the esterification of free fatty acids can be used including homogeneous and heterogeneous catalysts. The preferred acid catalysts are mineral acids such as hydrochloric acid, sulfurous acid, sulfuric acid, phosphoric acid, and phosphorous acid. However other strong acids including organic and inorganic acids can be used. Examples of strong organic acids include alkyl sulfonic acids such as methylsulfonic acid; alkylbenzene sulfonic acids such as toluene sulfonic acid; naphthalenesulfonic acid; and trichioroacetic acid. Solid acid catalysts include NAFION® resins. Sulfuric acid and phosphoric acid are preferred due to non-volatility and low cost with sulfuric acid being most often used due to its availability and strong acidity. Sulfuric acid may be provided in any suitable grade including, but not limited to highly concentrated, e.g., 98 percent, sulfuric acid, or in concentrated aqueous solutions, e.g., at least 30 percent, sulfuric acid. For the purposes of discussion in connection with facility 100, sulfuric acid is used as the acid.

The amount of acid catalyst provided can vary over a wide range. Typically the catalyst is provided in a catalytically effective amount of at least about 0.1 mass percent based upon the feed. Where soaps are present, the amount of acid should be sufficient to convert them to free fatty acids. Often the acid is present in an amount of at least about 0.2 to 5, say, 0.25 to 2, mass percent based upon the feed above that required to convert any soaps to free fatty acids.

The residence time for the acid treatment will depend upon the amounts of phospholipids and free fatty acid present, the conversion sought, the type and amount of catalyst used, the reactivity and amount of alkanol as well as the temperature of the process, and the type of reactor and extent of mixing. Residence times thus can range from less than 1 minute to over 1000 minutes. The residence times frequently are in the range of about 5 minutes to 120 minutes, preferably in the range of about 10 minutes to 90 minutes.

Acid treatment temperatures are generally between about 30° C. and 200° C. High temperatures are often unnecessary to achieve high conversions and thus temperatures in the range of about 30° C. or 40° C. to 150° C., and sometimes, 60° C. or 85° C. to 120° C., provide sufficient conversions of fatty acids and phospholipids with relatively short residence times. Preferred esterification temperatures are below about 90° C., more preferably below about 85° C., to attenuate the reaction rate of water with ester. The reaction pressure can be any suitable pressure, e.g., from about 10 to 5000, preferably from about 90 to 1000, kPa absolute.

During the acid treatment in reactor 106 some conversion of glycerides to esters may occur. The esters, diglycerides and monoglycerides essentially remain in the oil phase. Some glycerin will be produced as a result of the transesterification of the glycerides in the feed. The extent of such conversion is not critical but does result in lesser requirements of alkanol and catalyst in the transesterification section per unit of biodiesel produced as well as enabling increased performance such as rate of conversion and extent of conversion to be obtained. Generally up to about 20 mass percent, say, between about 0.1 to 15, and sometimes between 5 to 10, mass percent of the glyceride-containing feed is transesterified during acid esterification.

The acid treatment reaction product from reactor 106 is passed via line 108 to phase separator 110. Phase separator 110 is optional depending upon whether or not two phases exist. In some instances, an oil layer containing glycerides and fatty ester and a water-containing layer form. The water-containing layer can contain more polar components such as glycerin, water-soluble catalyst, alkanol, and water-soluble phosphorus compounds. As shown, a neutralized spent glycerin stream from the base pretreatment section is provided via line 170A and contacted with the acid treatment product. The spent glycerin aids in the extraction of water and water-soluble phosphorus compounds. Additionally, the glycerin assists in making the phase separation. In this embodiment, the amount of glycerin added can vary widely. As relatively small amounts of water are produced during the acid esterification of free fatty acids, beneficial results can be achieved with relatively little spent glycerin being added. Often the spent glycerin added is less than about 20, preferably between about 0.5 and 10, mass percent of the stream from acid treatment reactor 106.

Phase separator 110 may be of any suitable design including a decanter, a phase separation facilitated decanter that contains coalescing sites, and a centrifuge. The lower, water-containing fraction exits separator 110 via line 112. This fraction contains some alkanol, water, water-soluble catalyst and water-soluble phosphorus compounds.

The oil fraction of separator 110 contains virtually no sulfuric acid, often some alkanol, relatively little water, unreacted free fatty acids, if any, fatty ester and glycerides. The fraction is passed via line 118 from separator 110 to fractionation column 120 to provide an overhead fraction containing alkanol and a bottoms stream containing oil. The overhead from column 120 can be recycled to acid treatment reactor 106 via line 122. Make up alkanol is provided via line 124.

The fractionation column may be of any suitable design including a flash column, stripping column, falling film evaporator, or trayed or packed column. If desired, more than one fractionation column can be used with one effecting separation of water from alkanol. Similarly a side draw 116 may be taken from distillation column 120 for the removal of water, and the fractionation column may be a divided wall column to enhance such separation. In an embodiment, a substantial portion of the water is removed by the phase separation in phase separator 110, and fractionation column does not separately recover water. Water will be contained in both the overhead and bottoms stream from column 120. However, the relatively small amount of water in the overhead can be recycled with alkanol via line 122 to reactor 106 without undue adverse effect. Water contained in the bottoms passes to the base pretreatment section and is removed from the oil phase therein.

In another embodiment, only a portion of the alkanol is removed by fractionation in column 120. The alkanol remaining in the oil phase is passed to the base pretreatment section. In the base pretreatment section alkanol can be reacted with glyceride to form esters and can be recovered in the spent glycerin phase for recycle to the acid treatment section. Thus, the capital and operating costs for fractionation column 120 can be reduced. Often the bottoms stream from fractionation column 120 contains between about 0.1 to 10, say, between about 0.5 and 5, e.g., 0.5 to 2, mass percent alkanol.

While shown as processing the oil phase from separator 110, fractionation column 120 may be positioned between acid treatment reactor 106 and separator 110 and serve to recover alkanol from the acid treatment product exiting reactor 106.

Numerous options exist for use of the oil phase from the acid treatment. If it contains little phospholipids and free fatty acids, preferably less than 0.1, more preferably less than 0.05, mass percent of each based on the oil phase, it can be directly passed to the transesterification component of the facility, i.e., to line 200. Alternatively, the oil phase can be passed to the base pretreatment component.

Pretreatment by Base

The base pretreatment uses glycerin produced in facility 100 to treat feed. The base pretreatment serves to recover alkanol contained in the glycerin phase from the transesterification section. Hence, the spent glycerin from the base pretreatment section may contain relatively little alkanol. Base pretreatment also serves to partially convert glycerides in the feed to fatty acid esters and mono- and di-glycerides. Thus, the amount of alkanol required to transesterify the pretreated feed will be less than had no base pretreatment occurred. Base pretreatment can also serve to remove phospholipids as glycerin-soluble components. Base pretreatment further removes free fatty acids from the glyceride-containing feed by saponification to glycerin-soluble soaps. Removal of the phospholipids and free fatty acids facilitates processing during transesterification and minimizes catalyst loss during transesterification cased by saponification of free fatty acids with base catalyst. Phospholipids, for instance, tend to make more difficult phase separations of oil and glycerin in the transesterification component. And biodiesel must meet stringent phosphorus specifications. See, for instance, ASTM D 6751, American Society for Testing and Materials.

As shown in the facility of FIG. 1, a glyceride-containing feed stream is provided by line 132 to base reactor 134. The feed stream may comprise a fresh glyceride-containing feed. Alternatively or in addition, the feed stream may comprise the oil phase from the acid treatment provided via lines 126 and 130. To base reactor is also provided a glycerin and base catalyst-containing stream via line 142 which will be further discussed below. Preferably a non-acidic inerting gas such as nitrogen and hydrocarbon gas such as methane is used during base pretreatment.

In base reactor 134, free fatty acids contained in the feed stream are reacted with base catalyst to form soaps. If the free fatty acid content of the feed stream requires more than the amount of base catalyst introduced via line 142 for the desired degree of saponification, additional base can be added via line 133. The additional base may be the same as or different from that comprising the catalyst, and may be one or more of alkali metal hydroxides or alkoxides and alkaline earth metal hydroxides, oxides or alkoxides, including by way of examples and not in limitation, sodium hydroxide, sodium methoxide, potassium hydroxide, potassium methoxide, calcium hydroxide, calcium oxide and calcium methoxide.

To the extent that phospholipids are present in the feed stream to base reactor 134, at least a portion is chemically reacted, e.g., by a hydration or by a salt formation, to provide chemical compounds preferentially soluble in glycerin.

Base reactor 134 is maintained under base reaction conditions, which for free fatty acid-containing feed streams is that sufficient to react basic catalyst and free fatty acids to soaps and water, and for phospholipids-containing feed streams is that sufficient to react basic catalyst and phospholipids to chemical compounds preferentially soluble in a glycerin phase. Typical base reaction conditions include a temperature of at least about 10° C., say, 35° C. to 150° C., and most frequently between about 40° C. and 80° C. Pressure is not critical and subatmospheric, atmospheric and super atmospheric pressures may be used, e.g., between about 1 and 5000, preferably from about 90 to 1000, kPa absolute. The residence time is sufficient to provide the sought degree of saponification of fatty free acids and reaction of phospholipids. The residence time in base reactor 134 may range from about 1 minute to 10 hours.

Base reactor 134 may be of any suitable design. Reactor 134 may be a vessel or a length of pipe. But preferably other types of vessels are used such as mechanical and sonically agitated reactors, and reactors with static mixing such as reactors containing contact structures such as trays, packing, baffles, orifices, venturi nozzles, tortuous flow path, and other impingement structures. Suitable reactors include those providing high intensity mixing, including high shear.

The base reaction product from reactor 134 contains glycerin, glycerides, soaps, water, reacted phospholipids and often fatty acid ester and is passed via line 136 to separator 128. Separator 128 serves to separate the less dense oil layer from the more dense glycerin layer. The soaps and reacted phospholipids preferentially pass to the glycerin layer as does most of the water. The oil layer preferably contains less than about 0.5 mass percent soaps and less than about 500, preferably less than about 300, ppm-m phosphorus (calculated the elemental phosphorus). Phase separator 128 may be of any suitable design including a decanter, a phase separation facilitated decanter that contains coalescing sites, and, if needed, a centrifuge.

The glycerin phase is withdrawn from separator 128 via line 137 and may be sent to glycerin recovery or another application. If the glycerin layer contains significant amounts of soaps, it may be desirable to recycle the soaps to acid treatment reactor 106 for conversion to fatty esters. As shown, a portion or all of the glycerin phase may be passed via line 170 to acidification reactor 172 where soaps are converted to free fatty acids. At least a portion of this glycerin phase is passed via line 170A to provide the glycerin to assist in the separation of water, water-soluble catalyst (or salts thereof) and phosphorus-containing species from the acid treatment product in phase separator 110. The glycerin-containing phase from separator 110 is passed via line 112 to line 170. Also as shown, a portion of the glycerin phase in line 172 is recycled to reactor 134 via line 170B. The recycle can serve several purposes. For instance, hydrated phospholipids are returned to reactor 134 where they may undergo transesterification to recover additional fatty acid ester. Also, any base contained in the recycled glycerin stream is available for saponification of free fatty acids.

Unless acid contained in the acid treatment effluent of line 108 is neutralized prior to being passed to separator 110, the glycerin-containing phase from separator 110 will contain water-soluble acid which can be used as acid for acidification reactor 172. Acid can also be provided via line 174. Acidification reactor 174 may be one or more vessels of any suitable design including a length of pipe and other types of vessels such as mechanical and sonically agitated reactors, and reactors with static mixing such as reactors containing contact structures such as trays, packing, baffles, orifices, venturi nozzles, tortuous flow path, and other impingement structures. Suitable reactors include those providing high intensity mixing, including high shear. The acidification conditions usually encompass a temperature in the range of about 20° C. to 150° C., a pressure from about 1 to 5000, preferably 90 to 1000, kPa absolute, and a residence time of from about 1 second to 5 hours. Suitable acids include mineral acids and organic acids, but typically a readily available acid such as sulfuric or phosphoric acid is used. The amount of acid is usually sufficient to convert substantially all the soaps to free fatty acid. The use of excess acid is not deleterious to the formation of the free fatty acids, but can entail additional expense. Accordingly the molar ratio of acidifying acid function to soaps is in the range of about 1:1 to 1.5:1. Generally the pH of the glycerin stream is less than about 6, say, between about 1 and 5, e.g., 2 and 4. The acidity of the glycerin stream is determined by diluting the glycerin stream to 50 volume percent water and measuring the pH.

The glycerin stream from acidification reactor is passed via line 176 to contact vessel 178 into which glyceride-containing feed is provided via line 102. In contact vessel 178 the glycerin stream is contacted with fresh feed which serves to extract a portion of the alkanol from the glycerin phase. The contact with the glycerin also serves to remove water from the feed. Removal of water assists in the esterification of free fatty acids in acid treatment reactor 106 as the esterification is an equilibrium-limited reaction affected by water concentration.

Contact vessel 178 may be of any suitable design including a length of pipe and other types of vessels such as mechanical and sonically agitated reactors, and reactors with static mixing such as reactors containing contact structures such as trays, packing, baffles, orifices, venturi nozzles, tortuous flow path, and other impingement structures. Suitable reactors include those providing high intensity mixing, including high shear. The contact conditions usually encompass a temperature in the range of about 20° C. to 150° C., a pressure from about 1 to 5000 kPa absolute, and a residence time of from about 1 second to 5 hours. Often at least about 50 mass percent of the alkanol in the glycerin stream passes to the oil phase as do essentially all of the free fatty acids. The amount of alkanol recovered from the glycerin will depend upon the alkanol content of the glycerin, the ratio of glycerin to fresh feed, and the contacting conditions. Frequently the mass ratio of glycerin to oil is in the range of between about 1:5 to 1:20, say 1:8 to 1:15, and at least about 30, and sometimes between about 50 and 99, mass percent of the alkanol in the glycerin phase passes to the oil phase.

The ability to recover alkanol from glycerin by extraction with fresh feed can effectively be used to use glycerin as a complementary means for recycling unreacted alkanol to reactor 106. FIG. 1 shows two glycerin loops for alkanol recovery and recycle to the acid treatment reactor. The first loop involves the glycerin layer from separator 110 and the second, the glycerin layer from separator 128.

The fluid mixture from contact vessel 178 is passed via line 180 to phase separator 182. In phase separator 182, a glyceride and free fatty acid oil layer is produced that is passed via line 184 to acid treatment reactor 106. A glycerin-containing layer is discharged via line 186 and contains water, acidification acid, and soluble phosphorus compound. Separator 182 may be of any suitable design including a decanter, a phase separation facilitated decanter that contains coalescing sites, and, if necessary, a centrifuge. Contact vessel 178 and decanter 182 may be a single vessel, including but not limited to, a countercurrent extraction column.

If the acid treatment product from acid treatment reactor 106 has a sufficiently low free fatty acid content and low phospholipids content, another option is to eliminate separator 110 and fractionation column 120 and provide the acid treatment product in line 108 directly to separator 128 or base reactor 134.

Returning to separator 128, the oil phase is withdrawn and passed via line 138 to second pretreatment reactor 139. Second pretreatment reactor 139 and third pretreatment reactor 148 are adapted to recover alkanol contained in the glycerin from the transesterification component of facility 100 through reaction, e.g., transesterification and extraction into the glyceride-containing phase. A base transesterification process is used in these pretreatment reactors. While two reactors are shown, the number of reactors will depend upon the sought consumption of the alkanol as well as the efficiency of the reactors. Hence one, two, or three or more pretreatment reactors may be used. Also, the pretreatment reactor can comprise a number of stages in a single vessel which could be a countercurrent contact vessel. Advantageously, the feed stream to the alkanol consumption pretreatment reactors is relatively free from free fatty acids so as to prevent undue consumption of the base catalyst. Typically the pretreatment reactors provide a glycerin stream from which most of the alkanol has been removed. Often, the alkanol content of the glycerin discharged from base reactor 134 is less than about 5, and preferably less than about 2, mass percent.

In an alternative mode of operation, a significant portion of the alkanol is contained in line 126 (or line 108 if separator 110 and distillation column 120 are not used) and passed to separator 128. The concentration of alkanol in the glycerin-containing stream in line 170 may be higher than 5 mass percent, and alkanol is recovered be partitioning to the glyceride-containing feed in contact vessel 178. The alkanol content of the glycerin may be sufficiently low that no distillation is required to recover alkanol yet the overall process to make biodiesel can still exhibit high efficiencies.

Second pretreatment reactor 139 also receives the glycerin phase from the third pretreatment reactor. This glycerin phase contains glycerin, base catalyst, and alkanol. Second pretreatment reactor 139 is maintained under base transesterification conditions including the presence of base catalyst provided by the glycerin phase feed and elevated temperatures, often between about 30° C. and 220° C., preferably between about 30° C. and 80° C. to provide a second pretreatment product. The pressure is typically in the range of between about 90 to 1000 kPa (absolute) although higher and lower pressures can be used. The reactor is typically batch, semi-batch, plug flow or continuous flow tank. Preferably other types of vessels are used such as mechanical and sonically agitated reactors, and reactors with static mixing such as reactors containing contact structures such as trays, packing, baffles, orifices, venturi nozzles, tortuous flow path, and other impingement structures. Suitable reactors include those providing high intensity mixing, including high shear. However, depending upon the presence of soaps and phospholipids, care needs to be taken so as not to generate a product that cannot be readily separated by phase separation. The residence time will depend upon the desired degree of conversion of the contained alkanol, the ratio of alkanol to glyceride, reaction temperature, the degree of agitation and the like, and is often in the range of about 0.1 to 20, say, 0.5 to 10, hours.

The second pretreatment product contains glycerides, fatty esters, base catalyst and glycerin, and it has a reduced concentration of alkanol. The second pretreatment product is passed from second pretreatment reactor 139 via line 141 to separator 140. Separator 140 may be of any suitable design including a decanter, a phase separation facilitated decanter that contains coalescing sites, and, optionally, a centrifuge. The lower, glycerin-containing phase from separator 140 contains relatively little alkanol, preferably less than about 10 mass percent, and contains base catalyst, and is passed via line 142 to base reactor 134 where catalyst reacts with free fatty acids to form soaps which can then be removed from the glyceride-containing feed.

As depicted, line 142 is provided with holding tank 142A. Holding tank 142A can serve as a reservoir and enables the rate that glycerin, which contains base, is provided to base reactor 134, to be varied with changes in free fatty acid content of the acid treatment product. It also can permit additional reaction of glycerides with alkanol contained in the glycerin phase to occur prior to introduction into base reactor 134 where catalyst is consumed by conversion of free fatty acids to soaps.

The upper oil phase is removed from separator 140 via line 144 and is passed to line 146 which also receives the glycerin co-product from transesterification from line 248. The combined streams are passed to third pretreatment reactor 148. The stream is provided by line 248 and contains in addition to glycerin, alkanol, base catalyst, and usually some water and soaps. Table I sets forth typical compositions of the stream in line 248. The compositions, of course, will depend upon the operation of the transesterification component as well as which of the glycerin-containing streams from the transesterification component are used. The typical concentrations are based upon combining all glycerin-containing streams and operating under preferred parameters.

TABLE I

| Component | Broad, Mass % | Typical, Mass % |
|---|---|---|
| Glycerin | 40 to 80 | 50 to 70 |
| Alkanol (Methanol) | 15 to 50 | 25 to 45 |
| Catalyst (NaOCH$_3$) | 0.2 to 5 | 0.5 to 5 |
| Soaps | 0.1 to 5 | 0.5 to 5 |
| Water | 0.01 to 0.5 | 0.05 to 0.3 |
| Oil (glycerides and alkyl esters) | 0 to 5 | 0.5 to 2 |

Third pretreatment reactor 148 is maintained under base transesterification conditions including the presence of base catalyst provided by the glycerin-containing feed and elevated temperatures, often between about 30° C. and 220° C., preferably between about 30° C. and 80° C. to provide a first pretreatment product. Base catalyst in the transesterification component tends to partition to the glycerin phase and often adequate catalyst is provided for the base pretreatment section. In some instances, however, it may be desired to add additional base catalyst to third pretreatment reactor 148 or any preceding base pretreatment reactor. The pressure is typically in the range of between about 90 to 1000 kPa (absolute) although higher and lower pressures can be used. The reactor is typically batch, semi-batch, plug flow or continuous flow tank with some agitation or mixing. The preferred types of vessels are mechanical and sonically agitated reactors, and reactors with static mixing such as reactors containing contact structures such as trays, packing, baffles, orifices, venturi nozzles, tortuous flow path, and other impingement structures. Suitable reactors include those providing high intensity mixing, including high shear. However, depending upon the presence of soaps and phospholipids, care needs to be taken so as not to generate a product that cannot be readily separated by phase separation. The residence time will depend upon the desired degree of conversion, the ratio of alkanol to glyceride, reaction temperature, the degree of agitation and the like, and is often in the range of about 0.1 to 20, say, 0.5 to 10, hours.

Typically the transesterification in third pretreatment reactor 148 recovers through transesterification and extraction to the glyceride-containing phase at least about 20, preferably at least about 30, and more preferably at least about 50, mass percent of the alkanol fed to the reactor. Any unreacted alkanol in the oil phase will be carried with the oil phase to the transesterification component of facility 100. Often the total amount of alkanol recovered from the glycerin-coproduct from transesterification using all pretreatment stages is at least about 50, and sometimes at least about 80, mass percent.

The third pretreatment product passes from third pretreatment reactor 148 through line 150 to separator 152. Separator 152 may be of any suitable design including a decanter, a phase separation facilitated decanter that contains coalescing sites, and, optionally, a centrifuge. Separator 152 serves to separate an oil phase containing glycerides, esters and alkanol and some catalyst, from a glycerin-containing phase containing glycerin, reduced concentration of alkanol, and catalyst. The glycerin-containing phase frequently contains less than about 15 mass percent alkanol. The glycerin-containing phase from separator 152 is passed via line 154 to second pretreatment reactor 139.

Facility 100 includes a chiller 158 to remove high molecular weight glycerides, waxes and esters that are insoluble at the chiller temperature. Some feeds, such as crude corn oil, contain high molecular weight glycerides and esters. The hydrocarbyl moieties in these high molecular weight components typically have between 30 and 40 carbon atoms. If they remain in the oil, the resultant biodiesel product tends to have unacceptably high cloud points and gel points. As shown, the oil phase from separator 152 passes through line 156 to chiller 158. Chiller 158 is maintained at a temperature sufficient to cause high molecular weight and other components that lead to an increase in gel point temperature to solidify. Typically this temperature is between about 0° C. and 20° C. In some instances, cooling will tend to remove monoglycerides and diglycerides. Cooling below the desired temperature and then warming to a temperature to liquefy the mono- and di-glycerides while still maintaining a solid wax, can minimize loss of components that can be converted to biodiesel. The chilled oil phase is then passed via line 160 to centrifuge 162 to remove higher density components including solids and any remaining glycerin phase. The higher density fraction is discharged via line 164. Rather than using a centrifuge, the solids can be filtered from the glyceride-containing stream. Filter aids can be used if desired.

Chiller 158 is optional, and a chiller may also be used elsewhere in facility 100 to remove waxes. For instance, a chiller may be used to treat fresh feed in line 102 or can be used to treat biodiesel product from the refining component.

The pretreated glyceride product in line 156 is a unique producer composition that is a highly desirable feed for transesterification processes to make biodiesel.

The preferred producer compositions are summarized in Table II.

TABLE II

| Component | Preferred, mass % | More preferred, mass % |
|---|---|---|
| Triglyceride | 20 to 70 | 25 to 60 |
| Mono- and Di-glycerides | 10 to 25 | 12 to 22 |
| Fatty Ester | 20 to 50 | 30 to 45 |
| Alkanol | 0.5 to 5 | 1 to 5 |
| Phospholipids (calculated as elemental phosphorus) | Less than 30 ppm-m | Less than 10 ppm-m |
| Free Fatty Acid | Less than 0.1 | Less than 0.05 |
| Water | Less than 0.1 | Less than 0.05 |

Preferred producer compositions are substantially neutral and contain little, if any inorganic salts. In some instances the producer compositions are relatively free from sediment without treatment to remove waxes. The producer compositions of this invention also include those which have been treated to remove waxes. One method for qualitatively checking for sediment comprises cooling a sample to −1° C. for a minimum of 48 hours, warming it to about 20° to 25° C. and centrifuging per ASTM D-2709 test method. The most preferred producer compositions by visual inspection appear bright with no sediment. Another method involves filtration per ASTM D-6217 where a 300 milliliter sample is cooled to about 5° C. for at least 16 hours and filtered at 20° to 25° C. using a 0.7 micron filter and vacuum (about 15 to 30 kPa absolute). The most preferred producer compositions exhibit a filtration time of less than about 360 seconds.

If desired all or a portion of the producer composition in line 166 may be withdrawn via line 168 as an intermediate product for storage or sale as a feedstock for transesterification. Line 168 also provides the feed for the transesterification component of facility 100 by introducing the producer composition into line 200.

Transesterification

Line 200 provides glyceride-containing feed to first transesterification reactor 202. Line 200 can also supply additional glyceride-containing feed. Preferably the additional feed is relative free of free fatty acids and phospholipids such as refined oils sourced from rape seed, soybean, cotton seed, safflower seed, castor bean, olive, coconut, palm, corn, canola, fats and oils from animals, including from rendering plants and fish oils.

Alkanol for the transesterification is supplied to first transesterification reactor via line 206. The alkanol is preferably lower alkanol, preferably methanol, ethanol or isopropanol with methanol being the most preferred. The alkanol may be the same or different from the alkanol provided to acid pretreatment reactor 106 via line 124. Although line 206 is depicted as introducing alkanol into line 200, it is also contemplated that alkanol can be added directly to reactor 202 at one or more points. Generally the total alkanol (line 206 and from the producer composition of line 166) is in excess of that required to cause the sought degree of transesterification in reactor 202. Preferably, the amount of alkanol is from about 101 to 500, more preferably, from about 110 to 250, mass percent of that required for the sought degree of transesterification in reactor 202. In facility 100 three reactors are depicted as being used. One reactor may be used, but since the reaction is equilibrium limited, most often at least two and preferably three reactors are used. Often, where more than one reactor is used, at least about 60, preferably between about 70 and 96, percent of the glycerides in the feed are reacted in first transesterification reactor 202. It is possible to provide all the alkanol required for transesterification to first transesterification reactor 202, or a portion of the alkanol can be provided to each of the transesterification reactors.

The base catalyst is shown as being introduced via line 204 to first transesterification reactor 202. The amount of catalyst used is that which provides a desired reaction rate to achieve the sought degree of transesterification in first transesterification reactor 202. Preferably, catalyst is provided to each of the transesterification reactors since base catalyst preferentially partitions to the glycerin phase and is removed with phase separation of the glycerin after each transesterification reactor. The amount of catalyst used will be in excess of that required to react with the amount of free fatty acid contained in the feed oil, which due to the pretreatment, will be relatively little. The base catalyst may be an alkali or alkaline earth metal hydroxide or alkali or alkaline earth metal alkoxide, especially an alkoxide corresponding to the lower alkanol reactant. Preferred alkali metals are sodium and potassium. When the base is added as a hydroxide, it may react with the lower alkanol to form an alkoxide with the generation of water which in turn results in the formation of free fatty acid. Another type of catalyst is an alkali metal or alkaline earth metal glycerate. This catalyst converts to the corresponding alkoxide of the alkanol reactant in the reaction menstruum. Alternatively, the catalyst may be a heterogeneous base catalyst. Catalyst may need to be separately provided to the base pretreatment reactors if the base catalyst, e.g., a heterogeneous or oil soluble catalyst, is not carried with the co-product glycerin in the transesterification component to the base pretreatment reactors. However, homogeneous catalysts that have solubility in glycerin are preferred where the pretreatment component is used since the catalyst serves as at least a portion of the base used therein. The exact form of the catalyst is not critical to the understanding and practice of this invention. For the purposes of the following discussion, homogenous base catalyst is used. Preferably a non-acidic inerting gas such as nitrogen and hydrocarbon gas such as methane is used during base transesterification.

Often the transesterification is at a temperature between about 30° C. and 220° C., preferably between about 30° C. and 80° C. The pressure is preferably sufficient to maintain a liquid phase reaction menstruum and typically is in the range of between about 90 to 1000 kPa (absolute) although higher and lower pressures can be used. First transesterification reactor 202 is typically batch, semi-batch, plug flow or continuous flow tank with some agitation or mixing. Preferably the reactors are mechanical and sonically agitated reactors. Reactors with static mixing such as reactors containing contact structures such as trays, packing, baffles, orifices, venturi nozzles, tortuous flow path, and other impingement structures can be used. Suitable reactors include those providing high intensity mixing, including high shear. As stated above, one of the advantages of the processes of this invention is that the producer compositions do not require an induction period for transesterification to initiate. Accordingly plug flow reactors have enhanced viability. The residence time will depend upon the desired degree of conversion, the ratio of alkanol to glyceride, reaction temperature, the base catalyst concentration, the degree of agitation and the like, and is often in the range of about 0.02 to 20, say, 0.1 to 10, hours.

The partially transesterified effluent from reactor 202 is passed via line 208 to phase separator 210. Phase separator 210 may be of any suitable design including a decanter, a phase separation facilitated decanter that contains coalescing sites, and, optionally, a centrifuge. A glycerin-containing bottoms phase is provided in the separator and is removed via line 212 and is passed to glycerin header 214. As depicted, this stream is used as a portion of the glycerin for the pretreatment component of facility 100. This glycerin phase also contains any soaps made in reactor 202 and a portion of the catalyst. The soaps can be recovered from this stream in acidifying reactor 172 as discussed above. The lighter phase contains alkyl esters and unreacted glycerides and is passed via line 216 to second transesterification reactor 218. A rag layer may form in separator 210. The rag layer may contain unreacted glycerides, alkyl esters, alkanol, soaps, catalyst and glycerin. An advantage of the process set forth in FIG. 1 is that withdrawing the rag layer with the glycerin phase does not result in a loss of glycerides, alkyl esters, alkanol, and catalyst since the glycerin phase is passed to the pretreatment component of facility 100.

Reactor 218 may be of any suitable design and may be similar to or different than reactor 202. As shown, additional alkanol is provided via line 206A, and additional catalyst is provided via line 204A. Preferably the transesterification conditions in reactor 218 are sufficient to react at least about 90, more preferably at least about 95, and sometimes at least about 97 to 99.9, mass percent of the glycerides in the feed to the transesterification. The transesterification in reactor 218 is typically operated under conditions within the parameters set forth for reactor 202 although the conditions may be the same or different. The residence time will depend upon the desired degree of conversion, the ratio of alkanol to glyceride, reaction temperature, the degree of agitation and the like, and is often in the range of about 0.02 to 20, say, 0.1 to 10, hours.

The effluent from second transesterification reactor 218 is passed via line 220 to phase separator 222 which may be of any suitable design and may be the same as or different from the design of separator 210. A heavier, glycerin-containing phase is withdrawn via line 224 and passed to glycerin header 214. A lighter phase containing crude biodiesel is withdrawn from separator 222 via line 226.

As depicted, third transesterification reactor 228 is used and the crude biodiesel in line 226 is passed to this reactor. The transesterification conditions in reactor 228 are sufficient to provide essentially complete conversion, at least about 97 or 98 to 99.9, mass percent of the glycerides in the feed converted to alkyl ester. As shown, additional alkanol is provided via line 206B, and additional catalyst is provided via line 204B. The transesterification in reactor 228 is typically operated under conditions within the parameters set forth for reactor 202 although the conditions may be the same or different. The residence time will depend upon the desired degree of conversion. The reactor may be of the type described for reactor 202. The residence time will depend upon the desired degree of conversion, the ratio of alkanol to glyceride, reaction temperature, the degree of agitation and the like, and is often in the range of about 0.02 to 20, say, 0.1 to 10, hours. Advantageously, the transesterification product from third transesterification reactor 228 contains less than about 1, preferably less than about 0.8, and most preferably less than 0.5, mass percent soaps based upon the total mass of alkyl esters and soaps. The lighter phase also contains alkanol. In reactor 228 the reaction proceeds quickly to completion by the addition of additional alkanol and catalyst, and can be conveniently accomplished by a plug flow reactor.

The overall molar ratio of alkanol to glycerides in the feed to the reactors in the transesterification component, i.e., alkanol provided by lines 206, 206A and 206B, can vary over a wide range. Since transesterification is an equilibrium-limited reaction, the driving force toward the alkyl ester and the conversion of glycerides will be dependent upon the molar ratio of alkanol equivalents to glycerides. Alkanol equivalents are alkanol and alkyl group of the alkyl esters in the feed to the transesterification component. On the basis of transesterfiable substituents in the feed to the transesterification component, the mole ratio of alkanol equivalents to glyceride in the feed to the pretreatment component is frequently between about 3.05:1 to 15:1, say 4:1 to 9:1. Advantageously, the pretreatment processes of this invention permit the reuse of alkanol partitioned to the co-product glycerin without intermediate vaporization. Often the amount of total catalyst provided based upon the mass of feed to the first transesterification reactor, i.e., the catalyst provided by lines 204, 204A and 204B, is between about 0.3 and 1 mass percent (calculated on the mass of sodium methoxide).

The effluent from third transesterification reactor 228 is passed via line 230 to phase separator 232 which may be of any suitable design and may be the same as or different from the design of separator 210. A heavier, glycerin-containing phase is withdrawn via line 234 and passed to glycerin header 214. A lighter phase containing crude biodiesel is withdrawn from separator 232 via line 236. Alternatively, separator 232 can be eliminated provided that in second transesterification reactor 218, the conversion of the glycerides in the feed is at least about 90, preferably 92 to 96 or 98, percent. In some instances, the effluent from reactor 228 may be a single phase containing relatively little glycerin. In some instances it may be advantageous to use a centrifuge to separate the glycerin phase from the oil phase following third transesterification reactor 228.

Facility 100 contains an optional alkanol replacement reactor 238. The alkanol replacement reactor serves to transesterify the alkyl ester with a different alkanol. For purposes of transesterification in reactors 202, 218 and 228, an alkanol such as methanol provides not only attractive reaction rates but also an effluent that is more easily separated than, say, a reaction effluent where ethanol is the alkanol. In some instances it may be desired to provide a biodiesel that contains fatty esters in which the alkyl group of the fatty ester is branched in order to reduce cloud and gel points. The transesterification between, say, a fatty acid methyl ester, and higher molecular weight alkanol results in methanol, rather than glycerin, being formed, and often is more readily accomplished than the transesterification of glyceride with that higher alkanol. The higher alkanols include those having 2 to 8 or more carbons, and are preferably branched primary and secondary alkanols although tertiary alkanols may find application but generally are less reactive. Examples of higher alkanols include propanol, isopropanol, isobutanol, 2,2-dimethylbutan-1-ol, 2,3-dimethylbutan-1-ol, 2-pentanol, and the like. Other alkanols include benzyl alcohol and 2 ethylhexanol.

Where an alkanol replacement operation is desired, it may be located at various points in the process. For instance, the replacement alkanol may be provided via line 206B to reactor 228, or, as shown, it can follow reactor 228. In either case, alkanol replacement transesterification can take advantage of catalyst contained in the transesterification medium. Alternatively, alkanol replacement may be effected on a biodiesel product by adding catalyst. Thus, it can be located elsewhere in the refining component of facility 100 including, but not limited to, treating biodiesel in line 352.

The amount of higher alkanol provided via line 240 to alkanol replacement reactor 238 can vary over a wide range. Typically the molar ratio of higher alkanol to alkyl ester being fed to reactor 238 is less than 0.5:1, e.g., from about 1:100 to 1:5. Often the alkanol replacement transesterification is at a temperature between about 30° C. and 220° C., preferably between about 30° C. and 80° C. The pressure is preferably sufficient to maintain a liquid phase reaction menstruum and typically is in the range of between about 90 to 1000 kPa (absolute) although higher and lower pressures can be used. Alkanol replacement reactor 238 can be batch, semi-batch, plug flow or continuous flow tank with some agitation or mixing, e.g., mechanically stirred; ultrasonic, static mixer containing contact surfaces, e.g., trays, packing, baffles, orifices, venturi nozzles, tortuous flow path, or other impingement structures. High intensity mixing reactors, including high shear reactors, may also be used. Preferred reactors are those in which the alkanol being replaced is continuously removed. For instance, a reactive distillation reactor can be used to continuously remove displaced methanol from a transesterification of methyl ester and isopropanol. As depicted, reactor 238 is a reactive distillation unit and lower alkanol is withdrawn via line 330A and passed to the transesterification reactors. Make-up alkanol is provided via line 332.

Where the alkanol replacement reactor is a batch reactor, driving the replacement reaction to either essentially complete conversion of the higher alkanol or complete conversion of the methyl ester to the higher alkanol ester (depending upon whether the higher alkanol is provided below or at or above the stoichiometric amount required for complete conversion), since the vapor fractionation of methanol can continue until completion. With continuous reactors, having unreacted methanol and higher alkanol in the alkanol replacement product is likely. For purposes of this discussion, a continuous alkanol replacement reactor is used.

Where the base catalyst has been removed from the fatty acid ester of the lower alkanol, for instance, if the alkanol replacement were to be conducted on a refined or partially refined biodiesel, catalyst is provided. Suitable catalyst includes base catalyst such as is used for transesterification. Since a single liquid phase exists during the alkanol replacement unlike transesterification where a glycerin layer forms, heterogeneous catalysts and homogeneous catalysts having limited solubility in the reaction menstruum can be used. Solid catalysts are preferred to minimize or eliminate post treatment of the alkanol replacement product, but good contact with catalyst is desirable to timely achieve sought conversion. Homogeneous transesterification catalysts such as titanium tetra-isopropoxide are also advantageous as they are readily removed.

The residence time will depend upon the desired degree of conversion, the ratio of higher alkanol to alkyl ester, reaction temperature, the degree of agitation and the like, and is often in the range of about 0.02 to 20, say, 0.1 to 10, hours. Preferably at least about 80, and sometimes at least about 90, mass percent of the higher alkanol is reacted.

Refining

A crude biodiesel is withdrawn from reactor 238 via line 300 and is passed to the refining component of facility 100. The crude biodiesel may be contacted with acid to neutralize any catalyst therein and then refined to remove alkanol, soaps, water and glycerin.

In a preferred process, an acid, preferably an organic acid, is provided via line 302 in an amount sufficient to substantially neutralize residual base catalyst contained in the crude biodiesel. While inorganic acids can be used, organic acids, particularly those less volatile than the alkanol, and acids that do not themselves or any potential reaction product formed in contact with the crude biodiesel, form azeotropes with the alkanol, facilitate processing and minimize the potential of contamination of recovered alkanol. Exemplary acids include acetic acid, oxalic acid, glycolic, lactic, free fatty acid and the like. Citric acid is particularly preferred due not only to its low volatility, but also due to its relatively non-toxic nature, and its beneficial presence as a stabilizer in biodiesel. Generally the amount of catalyst contained in the crude biodiesel is quite small as base catalyst preferentially partitions to the glycerin phase. Accordingly, little acid is required to neutralize sufficient catalyst to enable refining without risk of reversion of alkyl ester. Often the amount of acid used is at least 0.95 times, sometimes between about 1 and 3 times, that required to neutralize the catalyst.

Crude biodiesel is passed via line 300 to an alkanol separation unit operation. As shown, a two stage separation unit is used. A single stage separator can be used if desired. The crude biodiesel in line 300 is passed to first alkanol separator stage 304. Separator 304 is of any convenient design including a stripper, wiped film evaporator, falling film evaporator, solid sorbent, and the like. Preferably the fractionation is by fast, vapor fractionation. Generally for a fast, vapor separation the residence time is less than about one minute, preferably less than about 30 seconds, and sometimes as little as 5 to 25 seconds. Preferably the vapor fractionation conditions comprise a maximum temperature of less than about 200° C., preferably less than about 150° C., and most preferably, when the lower alkanol is methanol, less than about 120° C. Depending upon the alkanol, the lower boiling fractionation may need to be conducted under subatmospheric pressure to maintain desired overhead and maximum temperatures. Where a falling film stripper is used, it may be a concurrent or countercurrent flow stripper. Concurrent strippers are preferred should there be a risk of undue vaporization of alkanol at the point of entry of the crude biodiesel. An inert gas such as nitrogen may be used to assist in removing the alkanol.

The fast fractionation may be effected by any suitable vapor fractionation technique including, but not limited to, distillation, stripping, wiped film evaporation, and falling film evaporation. Often the falling film evaporator has a tube length of at least about 1 meter, say, between about 1.5 and 5 meters, and an average tube diameter of between about 2 and 10 centimeters. Usually the vapor fractionation recovers at least about 70, preferably at least about 90, mass percent of the alkanol contained in the crude biodiesel. Any residual alkanol is substantially removed in any subsequent water washing of the crude biodiesel. Advantageously, the amount of alkanol contained in the spent water from the washing may be at a sufficiently low concentration that the water can be disposed without further treatment. However, from a process efficiency standpoint, alkanol can be recovered from the spent wash water for recycle to the transesterification reactors.

The lower boiling fraction containing the alkanol will contain a portion of any water contained in the crude biodiesel. Since the transesterification is conducted with little water being present, and a portion of the water is removed with the glycerin, the concentration of water in this fraction can be sufficiently low that it can be recycled to the transesterification reactors. This lower boiling fraction often contains less than about 1, and more preferably less than about 0.5, mass percent water.

Alkanol is exhausted from first alkanol separator stage via line 306 and may be exhausted from the facility as a by-product, e.g., for burning or other suitable use, or can be recycled. Where no alkanol replacement reaction is used, the alkanol will be the lower alkanol for the transesterification and is recycled to the transesterification section. The bottoms stream from first alkanol separation stage 304 is passed via line 308 to second alkanol separation stage 314 for additional alkanol recovery. The design of second alkanol separation stage 314 may be similar to or different than that of first alkanol separation stage 304 and may be operated under the same or different conditions. Alkanol exits via line 316 and is combined with alkanol from line 306 and is passed to condenser 318. In the process of facility 100, the condensed alkanol will contain both the lower alkanol and the higher alkanol. Condensed alkanol is recycled to line 330 to alkanol replacement reactor 238. Non-condensed gases exit condenser 318 via line 320. As shown, the alkanol separation operation is maintained under vacuum conditions and these gases are passed to liquid ring vacuum pump 322. The liquid for the liquid ring is provided via line 324 and exits via line 328. As the gases contain some alkanol, the liquid for the liquid ring vacuum pump will remove alkanol from the gases. The liquid may be water, in which case the water may need to be treated to remove alkanol. Alternative liquid streams can be used, including but not limited to glyceride-containing feed, biodiesel, and glycerin. Feed is preferred as the liquid for the liquid ring vacuum pump since it can be passed to a transesterification reactor and alkanol contained therein used for the transesterification. Gas is removed from liquid ring vacuum pump 322 via line 326.

The bottoms stream from the second alkanol separation stage exits via line 334 and is passed to separator 336 in which a glycerin-containing phase and a biodiesel-containing phase are separated. The presence of alkanol in the crude biodiesel enhances the solubility of glycerin therein. Upon removal of the alkanol, a separate glycerin-containing phase, which also contains soaps, tends to form during the alkanol separation operation. The glycerin fraction is removed from separator 336 via line 338 and can be combined with spent glycerin in line 186. The lighter, oil-containing phase is passed via line 340 to a water wash unit operation.

Line 340 serves as a reactor and mixer where strong acid is supplied. The amount of strong acid provided is sufficient to convert any soaps remaining to free fatty acids. Sufficient strong acid is used such that water used for washing the crude biodiesel is at a suitably low pH. The strong acid is supplied in admixture with a recycle stream in the wash operation as will be explained later. While line 340 serves as an in-line mixer, a separate vessel may be used for the acidification. Where a separate mixer is used, it may be of any convenient design, e.g., a mechanically or sonically agitated vessel, or static mixer containing static mixing devices such as trays, packing, baffles, orifices, venturi nozzles, tortuous flow path, or other impingement structure. In any event, sufficient mixing and residence time should be provided such that essentially all of the soaps are converted to free fatty acids. Often the temperature during the mixing is in the range of about 30° C. to 220° C., preferably between about 60° C. to 180° C., and for a residence time of between about 0.01 to 4, preferably 0.02 and 1, hours.

For purposes of discussion only and not in limitation, the water wash operation uses a two stage water wash. Water wash operation may be of any suitable design. Typically, the water wash operates with a recycling water loop, often with the water recycle being at least about 20, say between about 30 and 500, mass percent of the crude biodiesel being fed to the column. Normally washing is operated at a temperature between about 20° C. and 120° C., preferably between about 35° C. and 90° C. The amount of water provided to each wash vessel is sufficient to effect a sought removal of glycerin, residual alkanol and any water-soluble contaminants from the crude biodiesel. Typically between about 20 and 200, preferably between about 30 and 100, mass parts of wash water are used per 100 mass parts of crude biodiesel. Usually the free fatty acid is present in an amount less than about 3000, most frequently less than about 2500, parts per million by mass in the biodiesel product, and thus no need exists to remove free fatty acid to provide a biodiesel product meeting current commercial specifications. Preferably between about 1000 and 2500 ppm-m free fatty acid is contained in the biodiesel product to aid in lubricity.

The vessels used for the water washing may be of any suitable design including a pipe reactor, mechanically or sonically agitated tank, a vessel containing static mixing devices such as trays, packing, baffles, orifices, venturi nozzles, tortuous flow path, or other impingement structure. Each stage needs to effect a phase separation of the oil phase from the water phase. Such a separation may be inherent in, for instance, a wash column where the water and oil phases are moving countercurrently, or a separate phase separator may be provided. It is understood that other washing operations can be used such as a one vessel washing operation, an acid wash followed by a neutral wash, and the like. The washing may be effected in one or more stages and in one or more vessels. A single vessel, such as a wash column can contain a plurality of stages.

As shown, crude biodiesel is provided via line 340 to first wash stage 342. For purposes of discussion, wash stage 342 comprises an agitated vessel to provide desired contact between the oil and water phases and a decanter to effect separation. Typically, the agitated vessel provides a contact time of about 1 second and 10 minutes, say, 5 to 60 seconds. Crude biodiesel is contacted with acidic water from water loop 368. The washed biodiesel from first wash stage 342 is passed via line 344 to second wash stage 346 having a design similar to or different from that of stage 342. This biodiesel is contacted with water from water loop 364. In each stage the water, after contacting the biodiesel stream being processed, is returned to the respective loops. Acidic water is withdrawn from first wash stage 342 and recycled via line 368. Substantially neutral water is withdrawn from second wash stage 346 and recycled via line 364. Additional water is provided to line 364 via line 376 which will be described later.

As configured with separate water cycle loops, the pH of the water in second wash stage 346 may be neutral or less acidic than the water in first wash stage 342. Make-up water to line 368 is provided by line 366. A purge is taken from line 368 via line 372. The purge balances the amount of water in the wash loops and is at a suitable rate to maintain desirably low concentrations of impurities such as alkanol and glycerin in the water used for the washing. The purge is usually at a rate of between about 1 and 50, say 5 and 20, mass percent per unit time of the recycle rate in the loop.

Line 370 provides strong acid to the water recycled via line 368 for combining with crude biodiesel in line 340 or being passed to first wash stage 342. Adequate strong acid aqueous solution is provided that the water in line 368 has a pH sufficiently low to convert the soaps to free fatty acids. The acid may be any suitable acid to achieve the sought pH such as hydrochloric acid, sulfuric acid, sulfonic acid, phosphoric acid, perchloric acid and nitric acid. Sulfuric acid is preferred due to cost and availability and it is a non-oxidizing acid. The amount of strong acid aqueous solution provided is typically in a substantial excess of that required to convert the soaps to free fatty acid and to neutralize any remaining catalyst. The excess of acid is often at least about 5, preferably at least about 10, say between about 10 and 1000 times that required. Consequently the feed to first wash stage 342 provides wash water in line 368 having a pH of up to about 4, preferably between about 0.1 and 4.

Returning to line 372, the purge water is passed to evaporator 374 which provides a lower boiling fraction and a higher boiling fraction. While an evaporator may be used, it is also possible to use a packed or trayed distillation column with or without reflux. Generally the bottoms temperature of evaporator 374 is less than about 150° C., preferably between about 120° C. and 150° C. The distillation may be at any suitable pressure. A membrane separation system may, alternatively or in combination, be used with evaporator 374 to effect the sought concentration of the spent water.

The lower boiling fraction contains water, potentially acid if not neutralized or salts, and some alkanol and is passed via line 376 to water wash loop 364. Fresh water is provided to line 376 by line 380. The higher boiling fraction contains glycerin, some alkanol and some water and potentially acid or salts thereof. The higher boiling fraction or a portion thereof is preferably passed via line 382 to line 170 or it can be combined with spent glycerin.

A washed biodiesel stream is withdrawn from second washing stage 346 via line 348 and is passed to drier 350 to remove water which exhausts via line 354. Preferably substantially all the alkanol has been removed from the crude biodiesel prior to drying to permit the water vapor to be exhausted without treatment to eliminate volatile organic components. Drier 350 may be of any suitable design such as stripper, wiped film evaporator, falling film evaporator, and solid sorbent. Generally the temperature of drying is between about 60° C. and 220° C., say, about 70° C. and 180° C. The pressure is generally in the range of about 5 to 200 kPa absolute. The dried biodiesel is withdrawn as product via line 352. The biodiesel product contains free fatty acid and preferably has a free fatty acid content of less than about 0.3 mass percent. An inert gas such as nitrogen may be used in facilitating drying.

The subatmospheric pressure is maintained in drier 350 by the use of liquid ring vacuum pump 356 which is in communication with line 354. Liquid ring vacuum pump 356 uses water as the sealing fluid which provided by line 358 and water exits via line 362. The gases from liquid ring vacuum pump 356 exit via line 360.

Returning to glycerin header 214, the glycerin-containing streams are passed via line 242 to blending tank 246 such that a relatively uniform glycerin composition can be provided via line 248 to the pretreatment section of facility 100. Blending tank 246 may also provide sufficient residence time for any glycerides in the glycerin to transesterify with alkanol as well as permit any oil entrained in the glycerin phase to separate. As shown, an oil layer that forms in blending tank 246 can intermittently or continuously be withdrawn via line 247 for recycle to first transesterification reactor 202. Alternatively, the oil layer can be withdrawn with the glycerin and passed to the pretreatment section.

While all glycerin-containing streams from the transesterification and refining components of facility 100 have been show to be directed to glycerin header 214, it is within the purview of the process to use fewer streams. Moreover, any of the glycerin-containing streams may be used elsewhere prior to being passed to blending tank 246, and the blended stream or a portion thereof in line 248 may be used elsewhere and either returned to glycerin header 214 or passed to pretreatment component of facility 100.

One such use may be to pretreat a feed provided by line 200 to dehydrate the feed. If the feed contains free fatty acids or phospholipids, its introduction into the pretreatment component rather than via line 200, may be preferred. In such a pretreatment, a portion of the alkanol contained in the glycerin phase as well as some of the base catalyst, will be partitioned to the oil phase.

Figure 2:
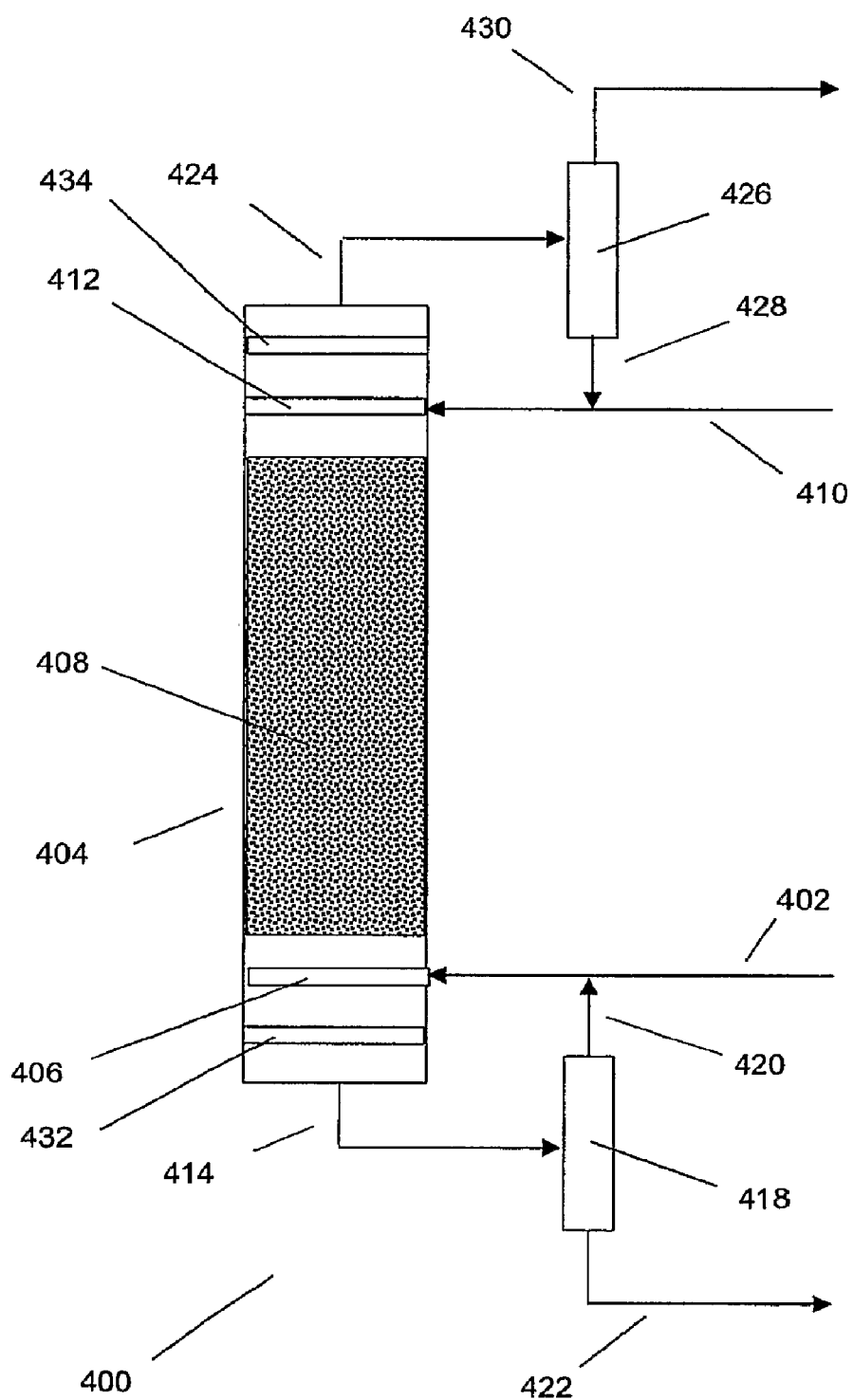
FIG. 2 is a schematic representation of a countercurrent contact reactor design useful for base pretreatment of glyceride-containing feeds.

FIG. 2 illustrates one type of reactor design 400 that can be used for the base pretreatment. As shown, a glyceride-containing feed is introduced into a lower section of counter-current contact reactor 404 via line 402. For purposes of discussion, the glyceride-containing feed contains free fatty acid and phospholipids. Sparger 406 substantially evenly distributes the glyceride-containing feed across the diameter of contact reactor 404. The sparger may be of any convenient design including one or more concentric annular rings, a cross or star-burst shape distributor. The sparger may also be a straight pipe with ports. The ports are sized such that the feed is introduced at a relatively low velocity, e.g., less than about 1 or 2, preferably less than about 0.7, say, between about 0.1 and 0.7, meter per second. The number of ports and placement are such that good distribution across the cross section of reactor 404 is obtained. Preferably the ports are positioned such that the feed is directed in an upward direction. Typically the ports have a diameter of less than about 2, say, about 0.5 to 1.5, centimeters. The glyceride-containing feed flows upwardly in reactor 404 and contacts packing 408.

Line 410 supplies a glycerin stream containing alkanol and base catalyst to an upper portion of reactor 404. The glycerin stream is distributed over the cross-section of reactor 404 by sparger 412 which may be the same or different from sparger 406. Preferably the ports in sparger 412 direct the glycerin stream downward for contact with packing 408.

Contact structure 408 may be of any suitable design to enhance contact between the oil phase including glycerides and free fatty acids and the higher density, glycerin stream. Contact structures include structured and unstructured packing materials and trays such as wire mesh, shaped elements such as spheres, plates with ridges, plates with holes, sieve trays, bubble trays, valve trays, baffles, chevrons, saddles, rings, and the like. If desired, the contact structure can be continuous or discontinuous with open regions between layers of contact structure. Preferably such open regions are subjected to agitation to aid in dispersing the oil and glycerin phases.

In the lower portion of the reactor, the fresh glyceride-containing feed is contacted with the down-flowing glycerin and free fatty acids are saponified with the base catalyst contained in the glycerin. The soaps preferentially pass to the glycerin phase. As the lighter oil phase passes upwardly in reactor 404, alkanol and glyceride are reacted in the presence of base catalyst provided by the glycerin stream. Additionally, alkanol is partitioned to the oil phase and the glycerin removes water.

Spent glycerin, which contains soaps, removed phosphorus compounds, and water, is removed from the bottom of reactor 404 via line 414 and passed to phase separator 418 to remove any entrained oil phase. The separated oil phase is passed via line 420 to line 402 for recycle to reactor 404. The spent glycerin layer is removed via line 422. An oil phase containing glycerides and fatty acid esters and a reduced or substantially eliminated content of free fatty acid, phospholipids and water is withdrawn from the top of reactor 404 via line 424 and passed to phase separator 426 to remove any entrained glycerin phase. The separated glycerin is returned to line 410 via line 428 for recycle to reactor 404. The separated oil phase is removed via line 430.

If desired, coalescers 434 and 432 may be used in the upper and lower portions of reactor 404 to assist in separating the oil and glycerin phases. Any suitable coalescer design may be employed. Typically coalescers comprise wire mesh or shaped elements, e.g., made for plastic or metal, such as plates with ridges and or holes, saddles, rings, and the like.

The overall size of reactor 404 will depend upon the capacity of the facility and the settling velocity of the droplets. The settling velocity is a function of the size of the droplets as well as the viscosity of the continuous phase and density differentials. The viscosity can be affected by the temperature.

Example

The following example is for purposes of illustration of one embodiment of the invention and is not in limitation of the broad aspects of the invention. All parts and percentages are by mass unless otherwise indicated or clear from the context.

A pilot plant having a capacity of about 100 liters per day employs a continuous base pretreatment section similar to that depicted in FIG. 1. For ease of reference, the parts numbers of FIG. 1 will be used in describing this example.

A glyceride feed which is a blend of 90 volume percent crude soy oil and 10 volume percent crude corn oil having about 1.2 mass percent free fatty acids and 1.5 mass percent phospholipids is provided at a rate of about 2.2 kilograms per hour via line 132 to base reactor 134. A glycerin-containing feed from line 248 is provided at a rate of about 0.4 kilograms per hour to third reactor 148. The glycerin stream contains 3.2 mass percent sodium methylate catalyst, and 36 mass percent methanol. Each of reactors 134, 139 and 148 is a stirred reactor having a volume of about 2 liters with a liquid level of about 1 liter and a blanket of nitrogen. Each reactor is maintained at a temperature of about 60° C. and atmospheric pressure.

The composition of the pretreated feed in line 156 is as set forth in Table III:

TABLE III

| Component | mass % |
|---|---|
| Triglyceride | 42.1 |
| Di-glycerides | 13.7 |
| Mono-glycerides | 4.0 |
| Fatty Ester | 36.7 |
| Methanol | 3.5 |
| Sodium Methylate | trace |
| Phospholipids | Less than 10 ppm-m |
| Free Fatty Acid | Less than 0.04 |
| Water | Less than 0.02 |

The pretreated feed in line 156 is passed to a transesterification component and refining component similar to those depicted in FIG. 1. No alkanol replacement reactor is used. About 0.45 kilograms per hour of methanol are provided to the transesterification component per kilogram of feed in line 156 with approximately 60 mass percent being provided to reactor 202, 20 percent to reactor 218 and 20 mass percent to reactor 228. Each reactor is a stirred reactor having a volume of about 2 liters with about 1 liter of liquid in each. A nitrogen blanket is maintained. About 14 grams of sodium methylate are used per kilogram of crude soy feed, and the sodium methylate is provided in proportions of approximately 60 mass percent being provided to reactor 202, 20 percent to reactor 218 and 20 mass percent to reactor 228. After refining, about 2.1 kilograms of biodiesel is obtained per kilogram of crude soy oil. The refined biodiesel meets specifications for biodiesel 100 (ASTM D 6751). The glycerin phase from all three reactors of the transesterification component is used as the glycerin feed to the base pretreatment section.

It is claimed:

1. A processes for making fatty acid esters from glyceride-containing feed containing free fatty acid and phosphorus-containing species comprising:
   a. transesterifying a pretreated glyceride feed with lower alkanol under transesterification conditions including the presence of base catalyst to provide a transesterification menstruum comprising a transesterification oil phase containing fatty acid ester and a transesterification glycerin phase containing unreacted lower alkanol and base catalyst;
   b. phase separating from said transesterification menstruum the transesterification oil phase and the transesterification glycerin phase;
   c. contacting at least a portion of the transesterification glycerin phase from step (b) with glyceride containing feed to provide menstruum comprising a pretreatment oil phase containing glycerides and a pretreatment glycerin phase, said contacting being for a time and at a temperature and in the presence of base catalyst sufficient to (i) react at least about 20 mass percent of the alkanol with glycerides to provide fatty acid ester, (ii) convert free fatty acids to soaps (iii) and convert phosphorus-containing species to phosphorus compounds soluble in glycerin; and
   d. phase separating the menstruum to provide a pretreated glyceride feed containing glyceride and lower alkanol and having a reduced concentration of free fatty acids and a reduced concentration of phosphorus-containing species, and a spent glycerin-containing phase containing soaps and phosphorus compounds and having a reduced concentration of alkanol.

2. The process of claim 1 wherein at least about 50 mass percent of the alkanol is reacted in step (c).

3. The process of claim 2 wherein at least about 80 mass percent of the alkanol in the glycerin stream is removed from the glycerin in step (c).

4. The process of claim 1 wherein the pretreated glyceride feed from step (d) contains less than about 0.5 mass percent free fatty acids and less that about 10 ppm-m phosphorus compound (calculated as elemental phosphorus).

5. The process of claim 1 wherein the glyceride-containing feed contains water and the pretreated glyceride feed from step (d) contains less than about 0.1 mass percent water.

6. The process of claim 1 wherein the glyceride-containing feed to step (c) contains between about 0.1 and 3 mass percent free fatty acid and the pretreated glyceride feed from step (d) contains less than about 0.05 mass percent free fatty acids.

7. The process of claim 1 wherein step (c) is conducted in at least two reaction stages wherein at least one stage converts at least a major portion of the free fatty acids in the glyceride feed to step (c) to soaps and at least one stage primarily consumes alkanol.

8. The process of claim 1 wherein step (c) is conducted using a countercurrent flow, extraction reactor.

9. The process of claim 1 wherein at least two reaction stages are used in the transesterification of step (a) with a phase separation of an oil phase and glycerin phase after each, and the glycerin phases from at least two reaction stages are combined and at least an aliquot portion is passed to step (c).

10. The process of claim 1 wherein the glyceride-containing feed to step (c) has been acid treated in the presence of lower alkanol to at least one of (i) reduce phosphorus compound content of the feed and (ii) reduce free fatty acid of the feed by converting free fatty acid to fatty acid ester.

11. The process of claim 10 wherein the feed to the acid treatment contains at least 5 mass percent free fatty acid and sufficient esterification occurs during acid treatment to provide a glyceride-containing feed to step (c) containing between about 0.5 and 2 mass percent free fatty acid.

12. The process of claim 11 wherein the glyceride-containing feed from the acid treatment contains alkanol.

13. The process of claim 1 wherein a rag layer is formed in at least one of the separations of steps (b) and (d) and at least a portion of the rag layer is passed to step (c).

14. The process of claim 1 wherein step (c) is conducted in at least two stages, at least one stage converts at least a major portion of the free fatty acids in the glyceride feed to step (c) to soaps and at least one stage primarily consumes alkanol.

15. A processes for making fatty acid esters from glyceride-containing feed containing free fatty acid and phosphorus-containing species comprising:
   a. acid treating said glyceride-containing feed in the presence of lower alkanol to at least one of (i) reduce phosphorus compound content of the feed and (ii) reduce free fatty acid of the feed by converting free fatty acid to fatty acid ester to provide an acid reaction product containing glycerides, fatty acid esters of said alkanol, and a reduced concentration of free fatty acids;
   b. phase separating an oil phase containing glycerides fatty acid esters and free fatty acids from a water-containing phase that further contains phosphorus compounds;
   c. contacting at least a glycerin stream containing at least about 20 mass percent lower alkanol and base catalyst with the oil phase from step (b) to provide a transesterification menstruum comprising a pretreatment oil phase containing glycerides and a pretreatment glycerin phase, said contacting being for a time and at a temperature and in the presence of base catalyst sufficient to (i) react at least about 20 mass percent of the alkanol with glycerides to provide fatty acid ester, (ii) convert free fatty acids to soaps (iii) and convert phosphorus-containing species to phosphorus compounds soluble in glycerin; and
   d. phase separating the menstruum to provide a pretreated glyceride feed containing glyceride and lower alkanol and having a reduced concentration of free fatty acids and a reduced concentration of phosphorus-containing species, and a spent glycerin-containing phase containing soaps and phosphorus compounds and having a reduced concentration of alkanol; and
   e. transesterifying at least a portion of the pretreated glyceride feed with lower alkanol under transesterification conditions including the presence of base catalyst to provide a transesterification product comprising fatty acid ester and glycerin, said product containing unreacted lower alkanol and base catalyst;

f. phase separating from said transesterification product an oil phase comprising fatty acid ester and a glycerin stream containing lower alkanol and base catalyst; and g. passing at least a portion of the glycerin stream from step (f) to step (c).

16. The process of claim 15 wherein the lower alkanol is methanol.

17. The process of claim 16 wherein the glyceride-containing feed to step (a) contains a mixture of glyceride-containing feeds.

18. The process of claim 17 wherein the glyceride-containing feed to step (a) comprises crude corn oil from the fermentation of corn to produce ethanol.

19. The process of claim 17 wherein the glyceride-containing feed to step (a) also contains at least one of crude and partially refined soy oil.

20. The process of claim 16 wherein the glyceride-containing feed to step (a) comprises crude corn oil from the fermentation of corn to produce ethanol.

21. The process of claim 16 wherein step (c) is conducted in at least two sequential reaction stages wherein at least one stage converts at least a major portion of the free fatty acids in the glyceride feed to step (c) to soaps and at least one stage primarily consumes alkanol, and wherein the flow of the glycerin stream of step (g) and the oil phase from step (b) are countercurrent with the glycerin stream being first passed to a stage that primarily consumes alkanol and the oil phase being first passed to a stage that converts a major portion of the free fatty acids.

22. The process of claim 16 wherein at least about 80 mass percent of the methanol in the glycerin stream of step (g) is removed in step (c).

23. A producer composition comprising:
   a. between about 20 and 70 mass percent triglyceride;
   b. between about 10 and 25 mass percent total mono- and di-glycerides;
   c. between about 20 and 50 mass percent fatty ester of lower alkanol;
   d. between about 0.5 and 5 mass percent lower alkanol;
   e. less than about 0.1 mass percent free fatty acid;
   g. less than about 0.1 mass percent water; and
   h. less than about 30 ppm-m phosphorus compound (calculated as elemental phosphorus).

24. The producer composition of claim 23 in which the free fatty acid is in an amount of less than about 0.05 mass percent; water is present in an amount of less than about 0.05 mass percent and phosphorus compound is present in an amount of less than about 10 ppm-m (calculated as elemental phosphorus).

25. The producer composition of claim 24 which is derived from a glyceride-containing feed containing triglyceride, at least 5 mass percent free fatty acid, and at least 50 ppm-m phospholipids (calculated as elemental phosphorus).

* * * * *